United States Patent
Henkel et al.

(10) Patent No.: US 6,583,735 B2
(45) Date of Patent: Jun. 24, 2003

(54) METHOD AND APPARATUS FOR ADAPTIVE BUS CODING FOR LOW POWER DEEP SUB-MICRON DESIGNS

(75) Inventors: Jörg Henkel, Princeton, NJ (US); Haris Lekatsas, Princeton, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/920,854

(22) Filed: Aug. 3, 2001

(65) Prior Publication Data

US 2002/0186597 A1 Dec. 12, 2002

Related U.S. Application Data

(60) Provisional application No. 60/265,330, filed on Feb. 1, 2001.

(51) Int. Cl.$^7$ .............................. H03M 7/34; H03M 7/38
(52) U.S. Cl. ........................................... 341/51; 712/300
(58) Field of Search ........................... 314/50; 365/200; 711/202; 712/300; 710/38, 51, 42

(56) References Cited

U.S. PATENT DOCUMENTS

| | | | |
|---|---|---|---|
| 5,983,174 A | * | 11/1999 | Wong et al. ................. 704/228 |
| 6,243,808 B1 | * | 6/2001 | Wang .......................... 712/300 |
| 6,405,342 B1 | * | 6/2002 | Lee ............................. 714/792 |

OTHER PUBLICATIONS

Farid N. Najm, *Transition Density: A New Measure of Activity in Digital Circuits*, IEEE Transactions on Computer–Aided Design of Integrated Circuits and Systems, vol. 12, No. 2, pp. 310–323, (Feb. 1993).

Milind B. Kamble and Kanad Ghose, Analytical Energy Dissipation Models For Low Power Caches, IEEE Proceedings of Symposium on Low Power Electronics and Design, pp. 143–148 (1997).

Kiyoo Itoh, Katsuro Sasaki and Yoshinobu Nakagome, Trends in Low–Power RAM Circuit Technologies, Proceedings of the IEEE, vol. 83, No. 4, pp. 524–543 (Apr. 1995).

Tony Givargis, Frank Vahid and Jörg Henkel, Fast Cache and Bus Power Estimation for Parameterized System–On–A–Chip Design, Proceedings of IEEE/ACM Conference on Design Automation and Test in Europe (Date00) (Mar. 2000).

Ricardo Gonzales and Mark Horowitz, Energy Dissipation in General Purpose Processors, IEEE Proceedings of Symposium on Low Power Electronics, pp. 12–13 (1995).

V. Tiwari, Logic and System Design for Low Power Consumption, Ph.D. thesis, Princeton University, Nov. 1996.

Mircea R. Stan and Wayne P. Burleson, Bus–Invert Coding for Low–Power I/O, IEEE Transactions on VLSI Systems, vol. 3, No. 1, pp. 49–58 (Mar. 1995).

Preeti R. Panda and Nikil D. Dutt, Low–Power Memory Mapping Through Reducing Address Bus Activity, IEEE Transactions on VLSI Systems, vol. 7, No. 3, pp. 309–320 (Sep. 1999).

(List continued on next page.)

*Primary Examiner*—Michael Tokar
*Assistant Examiner*—John B Nguyen
(74) *Attorney, Agent, or Firm*—Sughrue Mion, PLLC

(57) ABSTRACT

The power consumption of interconnects starts to have a significant impact on a system's total power consumption. Besides increasing buses (length, width) etc. this is mostly due to deep sub-micron effects where coupling capacitances between bus lines (wire-to-wire) are in the same order of magnitude as the base capacitances (wire-to-metal-layer). At that point, encoding schemes that solely address the minimization of transitions for the purpose of power reduction do not effectively work any more. Using a physical bus model that accurately models coupling capacitances, a signal bus encoding/decoding apparatus with encoding schemes that are partially adaptive and that take coupling effects into consideration is presented. The encoding schemes do not assume any a priori knowledge that is particular to a specific application.

8 Claims, 24 Drawing Sheets

OTHER PUBLICATIONS

Paul P. Sotiriadis and Anantha Chandrakasan, Low Power Bus Coding Techniques Considering Inter–wire Capacitances, Proceedings of IEEE Conference on Custom Integrated Circuits, pp. 507–510 (2000).

Ki–Wook Kim, Kwang–Hyun Baek, Naresh Shanbhag, C.L. Liu and Sung–Mo Kang, Coupling–Driven Signal Encoding Scheme for Low–Power Interface Design, Proceedings of IEEE 37th Design Automation Conference, pp. 318–321 (2000).

L. Benini, A. Macii, E. Macii, M. Poncino and R. Scarsi, Synthesis of Low–Overhead Interfaces for Power–Efficient Communication over Wide Buses, Proceedings of IEEE 36th Design Automation Conference, pp. 128–133 (1999).

Huzefa Mehta, Robert M. Owens and Mary J. Irwin, Some Issues In Gray Code Addressing, Proceedings of IEEE Conference, 6th Great Lakes Symposium on VLSI, pp. 178–181 (1996).

Ching–Long Su, Chi–Ying Tsui, and Alvin Despain, Saving Power in the Control Path of Embedded Processors, IEEE Design & Test Magazine, vol. 11, No. 4, pp. 24–31 (Winter 1994).

Luca Benini, Giovanni De Micheli, Enrico Macii, Donatella Sciuto and Cristina Silvano, Asymptotic Zero–Transition Activity Encoding for Address Busses in Low–Power Microprocessor–Based Systems, Proceedings of IEEE Conference, 7th Great Lakes Symposium on VLSI, pp. 77–82 (1997).

Enric Musoll, Tomás Lang and Jordi Cortadella, Working–Zone Encoding for Reducing the Energy in Microprocessor Address Buses, IEEE Transactions on VLSI Systems, vol. 6, No. 4, pp. 568–572 (Dec. 1998).

William Fornaciari, Donatella Sciuto and Cristina Silvano, Power Estimation for Architectural Exploration of HW/SW Communication on System–Level Busses, Proceedings of IEEE International Workshop on HW/SW Co–Design, pp. 152–156 (1999).

Andrea Acquaviva and Riccardo Scarsi, A Spatially–Adaptive Bus–Interface for Low–Switching Communication, Proceedings of IEEE International Symposium on Low Power Electronics and Design, pp. 238–240 (2000).

Sumant Ramprasad, Naresh Shanbhag and Ibrahim N. Hajj, A Coding Framework for Low–Power Address and Data Buses, IEEE Transactions on VLSI Systems, vol. 7, No. 2, pp. 212–221 (Jun. 1999).

Yan Zhang, Wu Ye and Mary J. Irwin, An Alternative Architecture For On–Chip Global Interconnect: Segmented Bus Power Modeling, Conference Record (Signals, Systems & Computers) of 32nd Asilomar Conference, pp. 1062–1065 (1998).

20. Mircea R. Stan and Wayne P. Burleson, Low–Powet Encodings for Global Communications in CMOS VLSI, IEEE Transactions on VLSI Systems, vol. 5, No. 4, pp. 444–455 (Dec. 1997).

* cited by examiner

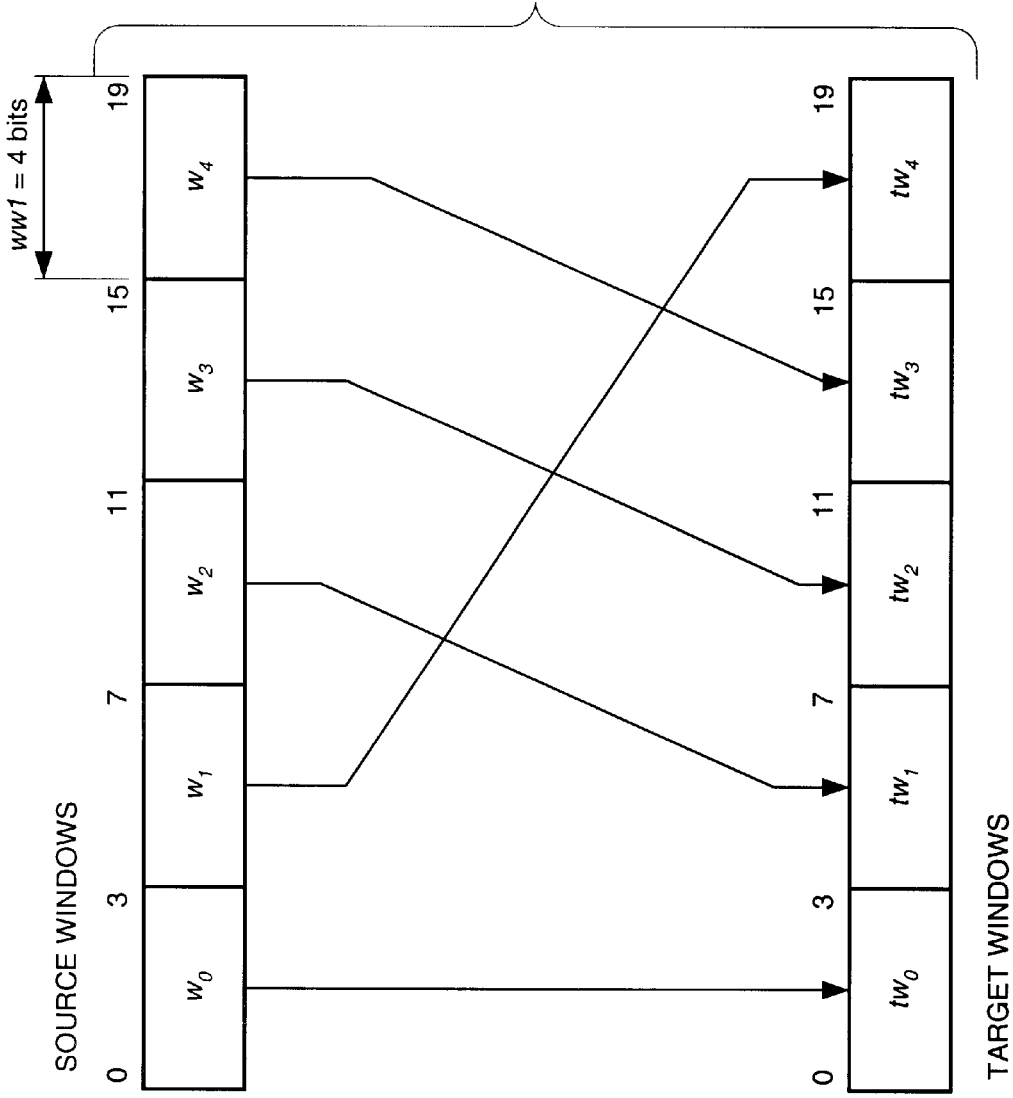

METHOD AND APPARATUS FOR ADAPTIVE BUS CODING FOR LOW POWER DEEP SUB-MICRON DESIGNS

CROSS-REFERENCES TO RELATED APPLICATIONS

This application is an application filed under 35 U.S.C. §111(a), claiming benefit pursuant to 35 U.S.C. §120 of the filing date of the Provisional Application Serial No. 60/265,330 filed on Feb. 1, 2001, pursuant to 35 U.S.C. §111(b). The Provisional Application Serial No. 60/265,330 is incorporated herein by reference for all it discloses.

BACKGROUND OF THE INVENTION

1. Technical Field of the Invention

This invention is related to a method and apparatus for adaptive signal encoding schemes based on the capacitive coupling effects. The coupling effects include coupling capacitances between adjacent signal lines as well as coupling effects between signal lines and a metal layer. The invention does not assume any a priori knowledge that is particular to a specific set of signals traversing the signal lines.

2. Description of the Related Art

The following references provide useful background information on the indicated topics, all of which relate to the invention, and are incorporated herein by reference:

International Technology Roadmap for Semiconductors, 1999 Edition, http://www.semichips.org/news/events/itrs99/, downloaded and printed on Feb. 13, 2001;

Farid N. Najm, *Transition Density: A New Measure of Activity in Digital Circuits*, IEEE Transactions on Computer-Aided Design of Integrated Circuits and Systems, Vol. 12, No. 2, pp. 310–323, (February 1993);

Milind B. Kamble and Kanad Ghose, *Analytical Energy Dissipation Models For Low Power Caches*, IEEE Proceedings of Symposium on Low Power Electronics and Design, pp. 143–148 (1997);

Kiyoo Itoh, Katsuro Sasaki and Yoshinobu Nakagome, *Trends in Low-Power RAM Circuit Technologies*, Proceedings of the IEEE, Vol. 83, No. 4, pp. 524–543 (April 1995);

Tony Givargis, Frank Vahid and Jörg Henkel, *Fast Cache and Bus Power Estimation for Parameterized System-On-A-Chip Design*, Proceedings of IEEE/ACM Conference on Design Automation and Test in Europe (DATE00) (March 2000);

Ricardo Gonzales and Mark Horowitz, *Energy Dissipation in General Purpose Processors*, IEEE Proceedings of Symposium on Low Power Electronics, pp. 12–13 (1995);

V. Tiwari, *Logic and System Design for Low Power Consumption*, Ph.D. thesis, Princeton University, November 1996;

Mircea R. Stan and Wayne P. Burleson, *Bus-Invert Coding for Low-Power I/O*, IEEE Transactions on VLSI Systems, Vol. 3, No. 1, pp. 49–58 (March 1995);

Preeti R. Panda and Nikil D. Dutt, *Low-Power Memory Mapping Through Reducing Address Bus Activity*, EEE Transactions on VLSI Systems, Vol. 7, No. 3, pp. 309–320 (September 1999);

Paul P. Sotiriadis and Anantha Chandrakasan, *Low Power Bus Coding Techniques Considering Inter-wire Capacitances*, Proceedings of EEE Conference on Custom Integrated Circuits, pp. 507–510 (2000);

Ki-Wook Kim, Kwang-Hyun Baek, Naresh Shanbhag, C. L. Liu and Sung-Mo Kang, *Coupling-Driven Signal Encoding Scheme for Low-Power Interface Design*, Proceedings of IEEE $37^{th}$ Design Automation Conference, pp. 318–321 (2000);

L. Benini, A. Macii, E. Macii, M. Poncino and R. Scarsi, *Synthesis of Low-Overhead Interfaces for Power-Efficient Communication over Wide Buses*, Proceedings of IEEE $36^{th}$ Design Automation Conference, pp. 128–133 (1999);

Huzefa Mehta, Robert M. Owens and Mary J. Irwin, *Some Issues In Gray Code Addressing*, Proceedings of IEEE Conference, $6^{th}$ Great Lakes Symposium on VLSI, pp. 178–181 (1996);

Ching-Long Su, Chi-Ying Tsui, and Alvin Despain, *Saving Power in the Control Path of Embedded Processors*, IEEE Design & Test Magazine, Vol. 11, No. 4, pp. 24–31 (Winter 1994);

Luca Benini, Giovanni De Micheli, Enrico Macii, Donatella Sciuto and Cristina Silvano, *Asymptotic Zero-Transition Activity Encoding for Address Busses in Low-Power Microprocessor-Based Systems*, Proceedings of IEEE Conference, $7^{th}$ Great Lakes Symposium on VLSI, pp. 77–82 (1997);

Enric Musoll, Tomás Lang and Jordi Cortadella, *Working-Zone Encoding for Reducing the Energy in Microprocessor Address Buses*, IEEE Transactions on VLSI Systems, Vol. 6, No. 4, pp. 568–572 (December 1998);

William Fornaciari, Donatella Sciuto and Cristina Silvano, *Power Estimation for Architectural Exploration of HW/SW Communication on System-Level Buses*, Proceedings of IEEE International Workshop on HW/SW Co-Design, pp. 152–156 (1999);

Andrea Acquaviva and Riccardo Scarsi, *A Spatially-Adaptive Bus-Interface for Low-Switching Communication*, Proceedings of IEEE International Symposium on Low Power Electronics and Design, pp. 238–240 (2000);

Sumant Ramprasad, Naresh Shanbhag and Ibrahim N. Hajj, *A Coding Framework for Low-Power Address and Data Buses*, IEEE Transactions on VLSI Systems, Vol. 7, No. 2, pp. 212–221 (June 1999);

Yan Zhang, Wu Ye and Mary J. Irwin, *An Alternative Architecture For On-Chip Global Interconnect: Segmented Bus Power Modeling*, Conference Record (Signals, Systems & Computers) of $32^{nd}$ Asilomar Conference, pp. 1062–1065 (1998); and Mircea R. Stan and Wayne P. Burleson, *Low-Power Encodings for Global Communication in CMOS VLSI*, IEEE Transactions on VLSI Systems, Vol. 5, No. 4, pp. 444–455 (December 1997).

There will now be provided a discussion of various topics to provide a proper foundation for understanding the invention.

Minimizing power consumption of digital systems has become a crucial task. From a technology point of view, high power and/or energy consumption can cause integrated circuits to overheat, resulting in an acceleration of electromigration processes and other undesirable effects. An integrated circuit with a high consumption of energy will likely malfunction.

From an application point of view, the power/energy consumption of a system is crucial. For example, consider mobile computing devices: if the power/energy consumption is low, operational time between recharges is extended.

This extended operational time allows the implementation of additional functionality that previously could not be added due to energy constraints (e.g., a battery's limited amount of energy).

Many consumer devices are designed as a Systems-On-a-Chip (SOC) that comprise multiple system components (e.g., CPU, MPEG decoder, etc.) on a single silicon substrate. As SOC functionality and complexity increases, so does the communication infrastructure necessary for efficient (i.e., fast) information exchange information between those components. As a result, the amount of energy that the SOC communications infrastructure (e.g., signal groups, bus lines, etc.) consumes has a significant impact.

The trend towards deep sub-micron designs of 0.18 microns or less also contributes to the increasing impact of power/energy consumption of the communication infrastructure. Effects that could be neglected in the past are now becoming increasingly important. One effect is the coupling capacitance that exists between physically close signal lines. The spatial closeness of signal lines increases the wire-to-wire capacitance such that it may exceed the base capacitance of a wire, i.e., the wire-to-metal-layer capacitance. In this context, a "metal layer" is a layer on integrated circuit layout having a zero voltage potential.

For CMOS circuits, it is implicitly assumed that power consumption is due to switching activity only. Leakage currents, however, might become a larger source of power consumption in the future. At present, switching activity in CMOS is the primary source of power consumption.

With these coupling effects in mind, the number of switching activities of a group of signals (e.g., a series of transitions on a group of address bus lines) does not necessarily reflect the power that is consumed by the group of signals. As noted by Najm, this is true for non-deep sub-micron designs. In this context, a non-deep sub-micron design is a design wherein the spatial proximity of signal lines or devices does not lead to coupling capacitances that are in the same order of magnitude as the intrinsic (i.e., base) capacitances. Hence, encoding mechanisms for reducing signal line power consumption that rely solely on minimizing the number of transitions are not efficient any more. In fact, any efficient encoding scheme for deep sub-micron signal lines should be based on a precise physical signal line model.

Power modeling/optimization of SOCs has been addressed at various levels of abstraction, as well as for various system components. Kamble et al. discuss analytical models for estimating the energy dissipation of conventional caches and low power caches. Itoh et al. disclose energy conservation for dynamic and static random access memory components. Givargis et al. disclose techniques for estimating power consumption of caches and bus subsystems within a SOC. Gonzales and Horowitz discuss how pipelining affects the energy-delay product inside general-purpose processors. This list is exemplary in nature, and is given only to present an overview of power optimization efforts in other areas of integrated circuit design.

Early work on minimizing the transition activities on input/output buses has been conducted by Stan and Burleson. The idea is to transmit the inverted word through the input/output bus when the Hamming Distance (HD) of the non-inverted word would result in HD>N/2 with N being the number of input/output bus lines. This approach requires minimal additional logic, plus one control bus line that signals whether or not the invert mode is being applied for a particular transition. Panda et al. approach the problem of reducing switching activities of address busses by exploiting the characteristics of accesses to memory arrays. Various scenarios for memory mapping schemes due to different memory organizations were investigated.

Benini et al. present an adaptive approach for encoding signals that are transmitted through wide and heavily loaded buses. The approach uses algorithms to synthesize encoding and decoding logic that minimizes the average number of transitions on a heavily loaded bus.

Panda et al., Metha et al. and Su et al. have studied the exploitation of correlated access patterns (e.g., address buses) by using Gray Code encoding. Benini et al. have improved upon Gray Code using a methodology that benefits from the fact that a fairly high number of patterns in address buses are consecutive. Then, the receiving side of an address bus can calculate the address without the necessity to actually having the address code being transmitted via the address bus.

Musoll et al. have proposed a working zone encoding scheme to reduce the energy consumed by microprocessor buses. The encoding is adjusted to where, within an address word, the switching activity is actually taking place. Acquaviva et al. have presented a synthesis method for a spatially adaptive bus interface that does not need any a priori knowledge of the data being transferred.

Ramprasad et al. present a framework to study various encoding schemes for address and data buses that can be applied to high-capacitance buses. Zhang et al. provide an approach of segmenting a bus and thereby exploit the effect of having smaller effective bus capacitances that apply during bus transitions. Fornaciari et al. have investigated power consumption of buses from a system-level point of view and they quantify the effect of cache sizes and other parameters for different encoding methods. Another system-level oriented approach for communication architectures is presented by Stan et al., focusing on low power encoding techniques under specific consideration of influences on possible area and performance impacts.

The approach of Sotiriadis et al. takes into consideration the capacitances between signal lines, than just the wire-to-metal-layer capacitance. They use a static encoding technique to achieve power savings. Kim et al. introduce a coupling-sensitive invert scheme that also provides power savings.

The reduction of transition activity (i.e., the number of low/high, high/low transitions) does not necessarily lead to lower power consumption in deep sub-micron designs. The characteristics of deep sub-micron signal lines and the exploitation of these characteristics are just starting considered by designers, and designs with those characteristics (i.e., signal line-to-signal line capacitances are in the same order of magnitude as signal line-to-metal layer capacitances) will be commercially exploited in the near future. As opposed to the approaches of Sotiriadis et al. and Kim et al., the present invention is adaptive in nature and can exploit characteristics on the signal lines that are changing over time. In addition, the present invention quantifies the capacitances through the signal line capacitance model and the encoding schemes are adjusted to this model. The present invention uses a signal line capacitance model that reflects signal line-to-signal line capacitances in conjunction with an adaptive encoding scheme. The present invention improves power consumption as compared to Gray Code encoding which is accepted as the benchmark-encoding scheme for address buses.

SUMMARY OF THE INVENTION

The present invention has been made in view of the above circumstances and to overcome the above problems and limitations of the prior art.

Additional aspects and advantages of the present invention will be set forth in part in the description that follows and in part will be obvious from the description, or may be learned by practice of the present invention. The aspects and advantages of the present invention may be realized and attained by means of the instrumentalities and combinations particularly pointed out in the appended claims.

A first aspect of the present invention provides an encoding method for a plurality of closely spaced electrical signal paths, the encoding method comprising determining signal transition activity for each electrical signal path for a predetermined set of electrical impulses. For example, object code that is executing can be considered as a predetermined set of electrical impulses that transition across the plurality of closely spaced electrical signal paths. The encoding method further provides for the grouping the electrical signal paths into a plurality of source windows, and each source window comprises a portion of the electrical signal paths and each portion comprising adjacent electrical signal paths. The encoding method further provides cross-connecting the source windows to a plurality of target windows based upon a base capacitance between each of the electrical signal paths and a ground plane layer, a coupling capacitance between each of the electrical signal paths and the signal transition activity.

The encoding method further provides for the cross-connecting of source windows to target windows, by arranging the connections between the plurality of source windows and the plurality of target windows such that target windows having electrical signal paths with low signal transition activity are interposed between target windows having high signal transition activity. The encoding method further provides for the cross-connection of source windows to target windows by arranging the connections between the plurality of source windows and the plurality of target windows such that the two target windows having electrical signal paths with highest signal transition activity are separated by the remaining target windows.

A second aspect of the present invention provides an encoding method for a plurality of closely spaced electrical signal paths, the encoding method comprising determining signal transition activity for each electrical signal path for a given set of electrical impulses. For example, object code that is executing can be considered as a predetermined set of electrical impulses that transition across the plurality of closely spaced electrical signal paths. The encoding method further provides dividing the electrical signal paths into a number of windows such that $W=P/W_s$, wherein each window comprises a number of adjacent electrical signal paths, and W represents the number of windows, P represents the number of electrical signal paths, and $W_s$ represents the number of electrical signal paths in a window. The encoding method further provides arranging the windows such that windows having electrical signal paths with a large amount of signal transition history are separated by windows having electrical signal paths with a low amount of signal transition history.

A third aspect of the present invention provides an encoding method for a plurality of closely spaced electrical signal paths, the encoding method comprising determining a signal transition history for each electrical signal path for a given set of electrical impulses, and dividing the electrical signal paths into a number of windows such that $W=P/W_s$. Each window comprises a number of adjacent electrical signal paths, and W represents the number of window, P represents the number of electrical signal paths, and $W_s$ represents the number of electrical signal paths in a window. The encoding method further provides for arranging the windows such that the two windows having electrical signal paths with the largest amount of signal transition history are separated by the remaining windows.

A fourth aspect of the present invention provides an encoding method for a plurality of closely spaced electrical signal paths, wherein a predetermined set of synchronous electrical impulses traverse the electrical signal paths, the encoding method comprising determining a signal transition history for each electrical signal path for the predetermined set of synchronous electrical impulses, and dividing the electrical signal paths into a number of windows such that $W=P/W_s$. Each window comprises a number of adjacent electrical signal paths, and W represents the number of window, P represents the number of electrical signal paths, and $W_s$ represents the number of electrical signal paths in a window. The encoding method further provides arranging the windows such that the two windows having electrical signal paths with the largest amount of signal transition history are separated by the remaining windows, analyzing the signal transitions within each window, and if a majority of the windows contain a large amount of transition activity, inverting the synchronous electrical impulses.

A fifth aspect of the present invention provides an encoding method for an address bus, wherein a given set of synchronous address bit signals traverse the address bus, the encoding method comprises determining a signal transition history for each address bit on the address bus. The encoding method further provides dividing the address bus into a number of windows such that $W=P/W_s$. W represents the number of windows, P represents the number of bits in the address bus, and $W_s$ represents the number of address bus bits in a window. The encoding method further provides arranging the windows such that the two windows having address bus bits with the largest amount of signal transition history are separated by the remaining windows, and analyzing the address bus signal transitions within each window. If a majority of the windows contain a large amount of transition activity, the address bit signals traversing the address bus are inverted.

A sixth aspect of the present invention provides an encoding method for an address bus, wherein a given set of synchronous address bit signals traverse the address bus, the encoding method comprises determining a signal transition history for each address bit on the address bus, and dividing the address bus into a number of windows such that $W=P/W_s$. W represents the number of windows, P represents the number of bits in the address bus, and $W_s$ represents the number of address bus bits in a window. The encoding method further provides arranging the windows such that windows having address bits with a large amount of signal transition history are separated by windows having address bits with a low amount of signal transition history, and analyzing the address bus signal transitions within each window. If a majority of the windows contain a large amount of transition activity, the address bit signals traversing the address bus are inverted.

A seventh aspect of the present invention provides a signal encoding apparatus for a plurality of closely spaced signal lines, comprising a plurality of encoders connected to the plurality of closely spaced signal lines, a first multiplexer connected to the plurality of encoders to selectively switch between the output of each encoder, and an extended transition activity measurement circuit connected to the first multiplexer. The apparatus further provides a first signal inverter connected to the extended transition activity measurement circuit, and a first comparator to connected to the multiplexer, the comparator transmitting a signal to switch the multiplexer between the encoders.

The signal encoding apparatus further comprises a second signal inverter, a plurality of decoders connected to the second signal inverter, and a second multiplexer connected to the plurality of decoders. The extended transition activity measurement circuit comprises a plurality of extended transition activity measurement calculation circuit, and a majority extended transition activity measurement circuit connected to the plurality of extended transition activity measurement calculation circuits.

An eighth aspect of the present invention provides a signal encoding apparatus for a plurality of closely spaced signal lines, the apparatus comprising encoding means connected to the plurality of closely spaced signal lines, first multiplexing means connected to the plurality of encoding means to selectively switch between the encoding means, and extended transition activity measurement means connected to the first multiplexing means. The apparatus further comprises first signal inverting means connected to the extended transition activity measurement means, and first comparing means to connected to the first multiplexing means, the comparing means transmitting a signal to switch the first multiplexing means between the encoding means.

The apparatus of the present invention further provides a second signal inverting means connected to the output of the first signal inverting means, a plurality of decoding means connected to the first signal inverting means, and second multiplexing means connected to the plurality of decoding means. The extended transition activity measurement means comprises a plurality of extended transition activity measurement calculation means, and a majority extended transition activity measurement means connected to the plurality of extended transition activity measurement calculation means and outputting an inversion signal.

A ninth aspect of the present invention provides a signal encoding apparatus for a plurality of closely spaced signal lines, the apparatus comprising a plurality of encoders connected to the plurality of closely spaced signal lines, each encoder decomposing the plurality of closely spaced signal lines into a plurality of source windows, a first multiplexer connected to the plurality of encoders to selectively switch between the output of each encoder, and an extended transition activity measurement circuit connected to the first multiplexer that outputs an inversion signal. The apparatus further provides a first signal inverter connected to the extended transition activity measurement circuit, the first signal inverted receiving the inversion signal, and a first comparator to connected to the multiplexer, the comparator transmitting a signal to switch the multiplexer between the encoders.

The apparatus further provides a second signal inverter that receives the output of the first signal inverter and the inversion signal, a plurality of decoders connected to the second signal inverter, and a second multiplexer connected to the plurality of decoders. The second comparator outputs a switching signal to the second multiplexer based upon an executing task size.

The plurality of source windows in each encoder of the apparatus is cross-connected to target windows based upon the capacitance of the closely spaced signal lines. More specifically, the cross-connections between the source windows and the target windows in each decoder are such that target windows having signal lines with low signal transition activity are interposed between target windows with high signal transition activity. In the alternative, the cross-connections between the source windows and the target windows in each decoder are such that the two target windows having signal lines with highest signal transition activity are separated by the remaining target windows.

The apparatus further provides an extended transition activity measurement circuit comprising a plurality of extended transition activity measurement calculation circuits, and a majority extended transition activity measurement circuit connected to the plurality of extended transition activity measurement calculation circuits. The extended transition activity measurement circuit analyzes signal transitions on the closely spaced signal lines, and outputs the inversion signal based on the transition activity in the closely spaced signal lines.

The above aspects and advantages of the present invention will become apparent from the following detailed description and with reference to the accompanying drawing figures.

BRIEF DESCRIPTION OF THE DRAWINGS

The accompanying drawings, which are incorporated in and constitute a part of this specification, illustrate the present invention and, together with the written description, serve to explain the aspects, advantages and principles of the present invention. In the drawings:

FIG. 7C illustrates a third windowing scheme according to the present invention;

DETAILED DESCRIPTION OF THE INVENTION

Figure 1:
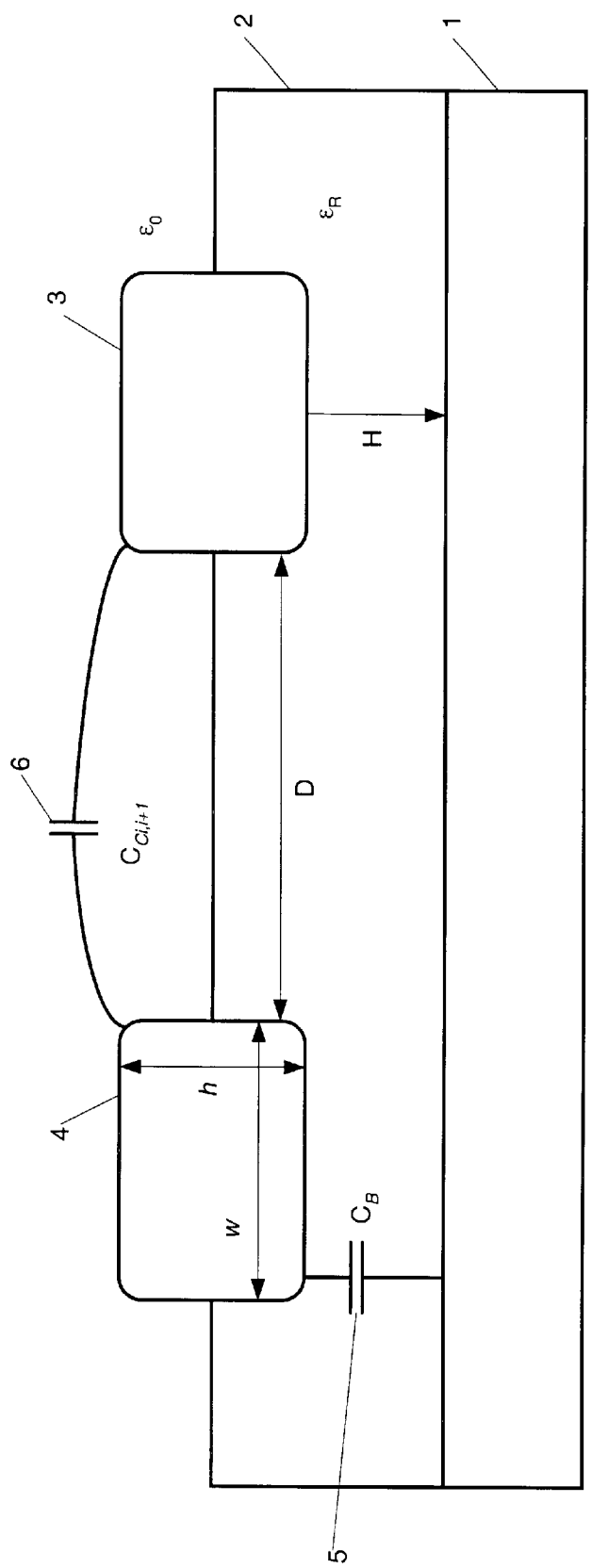
FIG. 1 is a cross-sectional illustration of two adjacent signal lines embedded in a substrate material.

Prior to describing the aspects of the present invention, some details concerning the prior art will be provided to facilitate the reader's understanding of the present invention and to set forth the meaning of various terms.

As used herein, the term "computer system" encompasses the widest possible meaning and includes, but is not limited to, standalone processors, networked processors, mainframe processors, and processors in a client/server relationship. The term "computer system" is to be understood to include at least a memory and a processor. In general, the memory will store, at one time or another, at least portions of executable program code, and the processor will execute one or more of the instructions included in that executable program code.

As used herein, the term "embedded processor" includes, but is not limited to, an embedded microprocessor and memory bearing object code instructions. Examples of embedded processors include, but are not limited to, personal digital assistants, cellular phones and digital cameras. In general, any device or appliance that uses a microprocessor, no matter how primitive, to control the functions of the device or appliance can be labeled as has having an embedded processor. The embedded microprocessor will execute one or more of the object code instructions that are stored on the memory. The embedded processor can include cache memory, input/output devices and other peripherals.

As used herein, the terms "predetermined operations," the term "computer system software" and the term "executable code" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

As used herein, the terms "media," "medium" or "computer-readable media" include, but are not limited to, a diskette, a tape, a compact disc, an integrated circuit, a cartridge, a remote transmission via a communications circuit, or any other similar medium useable by computers. For example, to distribute computer system software, the supplier might provide a diskette or might transmit the instructions for performing predetermined operations in some form via satellite transmission, via a direct telephone link, or via the Internet.

Although computer system software might be "written on" a diskette, "stored in" an integrated circuit, or "carried over" a communications circuit, it will be appreciated that, for the purposes of this discussion, the computer usable medium will be referred to as "bearing" the instructions for performing predetermined operations. Thus, the term "bearing" is intended to encompass the above and all equivalent ways in which instructions for performing predetermined operations are associated with a computer usable medium.

Therefore, for the sake of simplicity, the term "program product" is hereafter used to refer to a computer-readable medium, as defined above, which bears instructions for performing predetermined operations in any form.

A detailed description of the aspects of the invention will now be given referring to the accompanying drawings.

As mentioned in the introduction, deep sub-micron designs have quantitatively different characteristics as opposed to non-deep sub-micron designs. As far as signal line power consumption is concerned, the most important characteristic is the fact that the coupling capacitance between signal lines are in the same order of magnitude as the capacitance between a signal line and a metal layer.

Referring to FIG. 1, a simplified sectional view of signal line 3, which is adjacent to signal line 4. The signal lines 3,4 are embedded in a substrate layer 2. A metal layer 1 underlies the substrate layer 2. Two different capacitance types act on each signal line (each signal line is referenced by the index i). For purposes of illustration, the capacitances will be illustrated using capacitance symbols. Base capacitance 5 ($C_B$) is the capacitance between a signal line 3 and the metal layer 1. This is also referred to as the intrinsic capacitance. While FIG. 1 only shows the base capacitance 5 between the signal line 3 and the metal layer 1, in actual practice, there is a base capacitance between each signal line and the metal layer 1. The value of the base capacitance 5 is dependent upon the shape of the signal line (i.e., the width w and the height h shown in FIG. 1). In addition, the value of the base capacitance 5 is dependent distance H between the signal line 3 and the metal layer 1, as shown in FIG. 1. Other factors are the material characteristics ($\epsilon_r$) of the substrate layer 2 and metal layer 1, as well as how far the signal line 3 is buried into the substrate layer 2. This is due to the fact that the dielectric value for the portion of the signal line 3 that is buried ($\epsilon_r$) are not identical to the dielectric value for the portion of the signal line 3 that is exposed ($\epsilon_0$).

The other capacitance shown in FIG. 1 is the coupling capacitance 6 ($C'_{Ci,i+1}$) between adjacent signal lines 3, 4 (designated as line i and line i+1). Besides w, h and $\epsilon_r$, the distance D between two adjacent signal lines determines the size of the coupling capacitance 6. A solution that exactly quantifies both capacitances can be derived by numerically solving the corresponding differential equation. A simple exact formula cannot be given because of the cross sectional shape of the signal lines is neither a rectangle nor a circle. However, the solution can be closely approximated by assuming that the cross sectional shape of a signal line is actually a number of circular cross sections for which solutions can be found directly through the solution of the corresponding differential equations.

Thus, the following formula for a base capacitance 5 and one coupling capacitance 6 as shown in FIG. 1 is as follows:

$$C'_i = C'_{Bi} + C'_{Ci,i+1} \qquad \text{Equation (1A)}$$

$$C'_i = a_0 \cdot \underbrace{\frac{2\pi\epsilon_r\epsilon_0}{\operatorname{arcosh}\left(\frac{H}{h}\right)}}_{\text{signal line to metal layer}} + b_0 \cdot \underbrace{\frac{\pi\epsilon_r\epsilon_0}{\ln\left(\frac{D+w}{h}\right)}}_{\text{signal line to signal line}} \qquad \text{Equation (1B)}$$

Hence, the per-length capacitance $C'_i$ for signal line i is represented as a superposition of the base capacitance $C'_{Bi}$ (signal line to metal layer) and a coupling capacitance $C'_{Ci,i+1}$ (signal line to signal line) between signal line i and signal line i+1 (i.e., the closest right neighbor). This signal line capacitance model does, however, neglect capacitances resulting from signal lines in other layers of the integrated circuit layout. The factors $a_0$ and $b_0$ represent the correction factors that allow the use of simple equations for the solution of the differential equation, rather than using numerical methods. It can be shown, however, that this approximation is, in fact, an accurate representation.

The capacitance values of $C'_{Bi}$ (signal line to metal layer) and $C'_{Ci,i+1}$ (signal line to signal line) can be minimized to reduce energy consumption (as applied to Equation 1B). The basic ways are as follows:

1. Reduce in the distance H between the signal line and the metal layer 1. As shown in Equation 1B, the distance H influences the value of base capacitance $C'_{Bi}$ (signal line to metal layer). As the value of the distance H increases, the base capacitance $C'_{Bi}$ (signal line to metal layer) decreases in value. Typically, the technology process employed in constructing the integrated circuit determines the value of the distance H.
2. Reduce the cross-sectional size of the signal lines. As the signal line cross-sectional parameters h and w decrease in value, the value of the base capacitance $C'_{Bi}$ (signal line to metal layer) decreases as well. Please note that the signal line cross-sectional parameter w is implicitly contained in the factor $a_0$ according to the above explanation.
3. Reduce in the signal line pitch D between two adjacent signal lines. As the value of the signal line pitch D increases, the corresponding coupling capacitance $C'_{Ci,i+1}$ (signal line to signal line) between the two adjacent signal lines decreases. If signal line pitch D grows beyond a certain size, then the chip area consumed becomes unacceptable, since this signal line pitch is between all adjacent signal lines. For example, if the present invention is used for a data bus in a 64-bit general-purpose processor, the amount of chip area used by the data bus lines is quite large.

Although a reduction of signal line cross-sectional area (i.e., $\approx h \times w$) reduces the base capacitance $C'_{Bi}$ (signal line to metal layer), there are technological limits. For any given technology and a given voltage $V_{DD}$, a certain amount of charge (i.e., a number of electrons) is transferred during a switching phase, and the current density $I/(h \times w)$ is a constant. If the signal line cross-sectional area becomes too small, the signal lines may suffer degradation or destruction due to overheating or electro-migration.

Figure 2A:
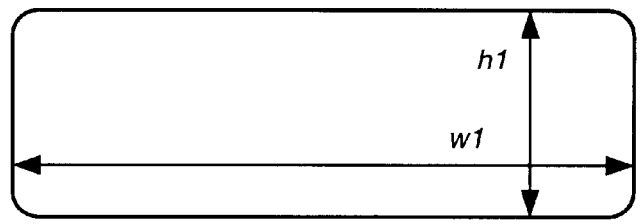
FIGS. 2A–2C illustrate several form-factors for signal lines.
Figure 2B:
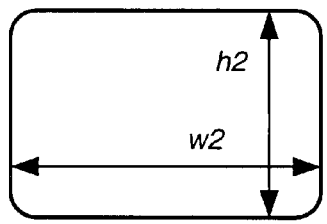
Figure 2C:
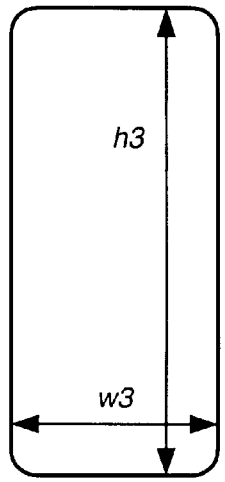

In deep sub-micron designs, the signal line cross-sectional area problem is overcome by considering different shapes. Referring to FIGS. 2A–2C, a series of signal line cross-sectional shapes are illustrated. Each signal line cross-sectional shape is approximately equal to the other cross-sectional shapes in terms of area. Referring to FIG. 2C, form-factor C is more compact in terms of chip area consumed, although nearly equal in cross-sectional area to form-factor A (FIG. 2A) and form-factor B (FIG. 2B). The coupling capacitance $C'_{Ci,i+1}$ (signal line to signal line) between adjacent signal lines, however, is increased due to the increase in the value of the cross-sectional parameter h (see Equation 1B). Referring to FIG. 2A, form-factor A is not used for deep sub-micron designs because of its inherent disadvantage in terms of chip area consumed. This is a major difference between a non-deep sub-micron design and deep sub-micron design. Referring to FIG. 2B, form-factor B represents a good compromise between the other types of form-factors.

So far, the coupling capacitance between one signal line and only one other adjacent signal line has been considered. In fact, coupling capacitances are theoretically present between any two signal lines, although the capacitances will differ in value depending upon the adjacency of the signal lines. For example, assume a set of signal lines is enumerated from 0 to N−1 where N represents the total number of signal lines. The total capacitance for signal line 0 is given by the following formula:

$$C'_0 = C'_{B0} + C'_{C0,1} + C'_{C0,2} + \ldots + C'_{C0,N-1} \quad \text{Equation (2)}$$

In fact, there is not always a coupling capacitance between two signal lines, and neither is the coupling capacitance exactly given through the second part of Equation 1B. This is due to a phenomenon known as the shield effect. For example, signal line i+1 can act as shield between signal line i and signal line i+2. Actually, smaller coupling capacitances between signal lines are the result. Therefore, a more general formulation of the capacitance of signal line i is as follows:

$$C'_i = C'_B + \sum_{j=0, j \neq i} (C'_{Ci,j} \cdot \text{s\_fct}(|i, j|) \cdot x_{i,j}) \quad \text{Equation (3)}$$

Figure 3A:
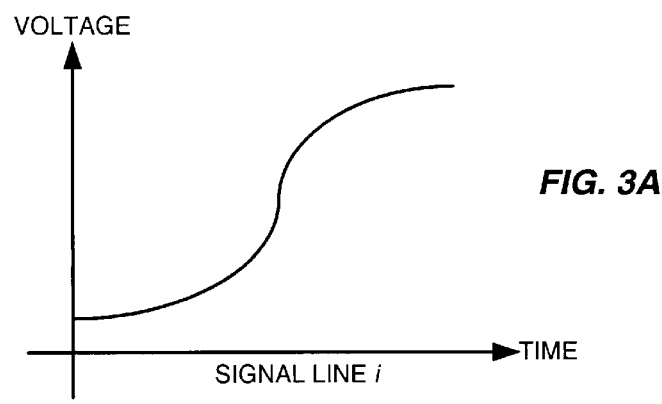
FIGS. 3A–3H illustrate the signal transitions for adjacent signal lines for determining if there is a coupling capacitance between the adjacent signal lines.
Figure 3B:
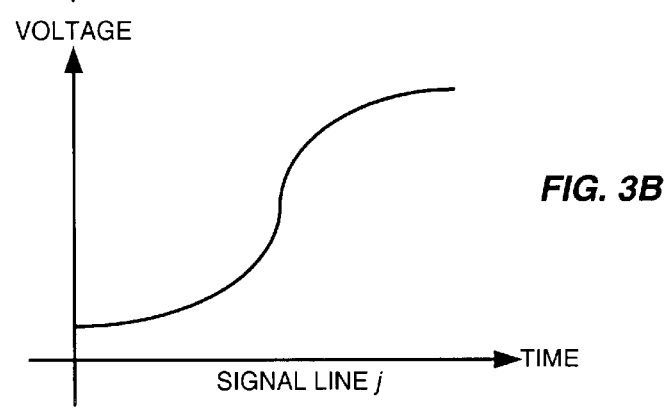
Figure 3C:
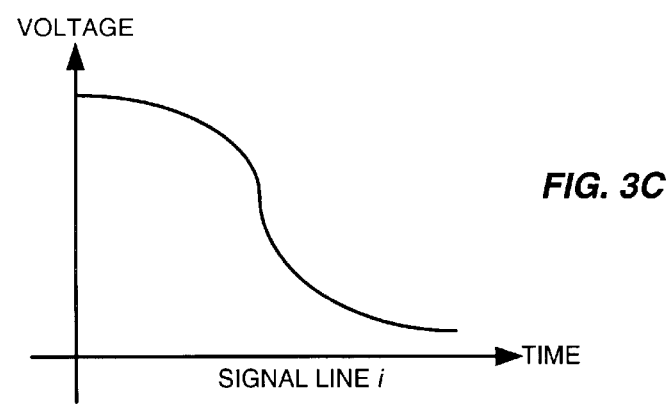
Figure 3D:
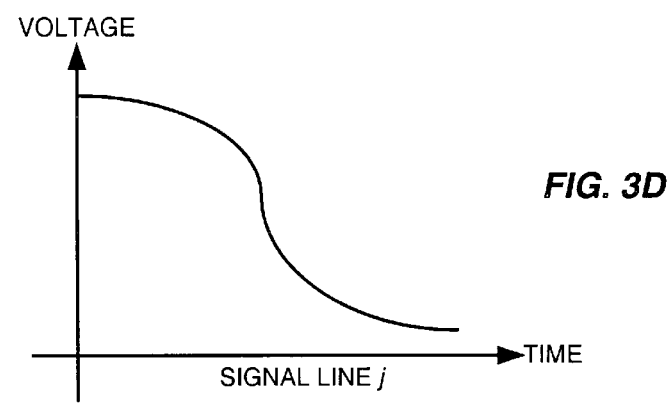

Please note that i≠j controls Equation 3. That is, by definition, there is no intrinsic coupling capacitance but a base capacitance $C'_{Bi}$ as discussed above. Equation 3 is a physical superposition (i.e., expressed by a sum) of all parts. An explanation of the various components follows:

1. $C'_{Ci,j}$ is the coupling capacitance between signal line i and signal line j. It is calculated through Equation 1B (right part) where the distance D has to be replaced by the actual distance (e.g., the distance between signal line i and signal line i+3 is 3D+2w).
2. s_fct(|i,j|) is the shield effect function that represents the shield-factor dependent on the physical distance between signal line i and signal line j. It decreases the actual capacitance values more than what the sole distance between two signal lines according to Equation 1B. This is because if two signal lines are not immediately adjacent, the signal lines interposed between them physically diminish the strength of the electrical field (i.e., act as a shield).
3. $X_{i,j}$ is a factor that reflects the fact that there can, or cannot, be a coupling capacitance between any two signal lines. Referring to FIGS. 3A–3B, signal line i is transitioning from a "low" state to a "high" state. At the same time, signal line j is also transitioning from a "low" state to a "high" state. Therefore, at no point in time is there a voltage level difference between these two signal lines. Thus, signal line i does not "see" any coupling capacitance with respect to signal line j, and neither does signal line j see any coupling capacitance with respect to signal line i (i.e., $C'_{Ci,j} = C'_{Cj,i} = 0$). Referring to FIGS. 3C–3D, the converse is true as well (i.e., both signal lines transition from a "high" state to a "low" state).

Figure 3E:
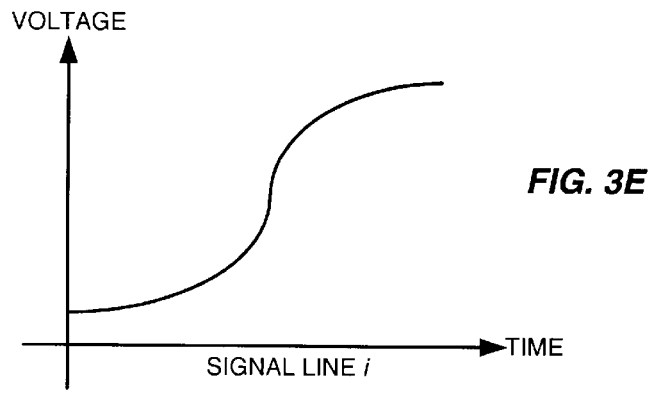
Figure 3F:
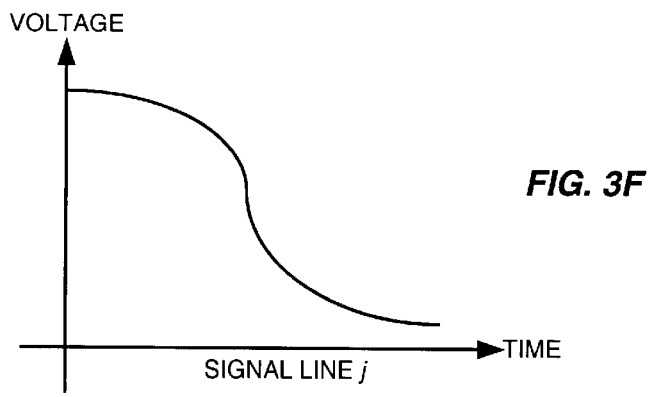
Figure 3G:
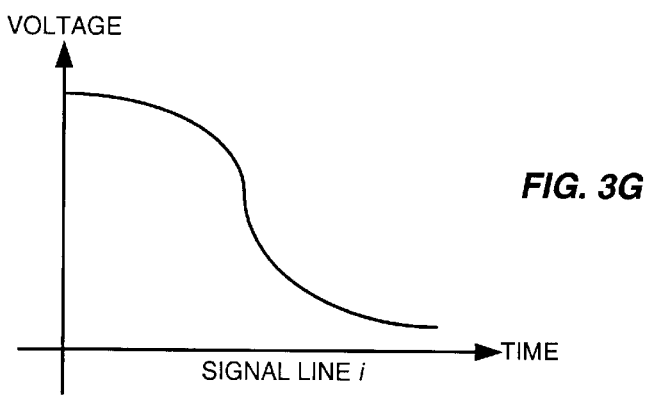
Figure 3H:
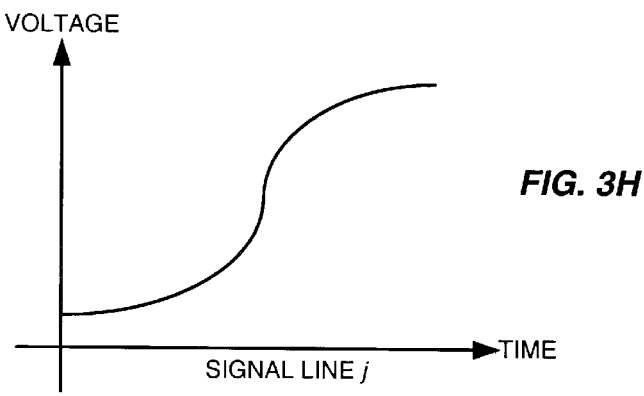

Referring to FIGS. 3E–3F, signal line i is transitioning from a "low" state to a "high" state. At the same time, signal line j is also transitioning from a "high" state to a "low" state. A coupling capacitance between signal line i and signal line j does exist due to a voltage level difference of approximately $V_{DD}$ prior to the transition. It is assumed that the signal transition takes place at the same point in time, even though physically the two signals may have a skew due to layout issues, slightly different signal speed due to manufacturing tolerances, or other reasons. Hence, there is a coupling capacitance. Referring to FIGS. 3G–3H, the converse is true as well (i.e., signal line i is transitioning from a "high" state to a "low" state. At the same time, signal line j is also transitioning from a "low" state to a "high" state.).

Accordingly, the following factors for $x_{i,j}$ are obtained:

$$x_{i,j} \begin{Bmatrix} 0: \text{identical transition} \\ 1: \text{opposite transition} \end{Bmatrix} \quad \text{Equation (4)}$$

As illustrated by the factor $x_{i,j}$ of the signal line capacitance model, the actual switching capacitance $C'_{Ci}$ of a signal line i depends on:
1. The behavior of all other signal lines during the switching of signal line i; and
2. Whether the signal line i actually transitions or not. In the trivial case, signal line i does not transition at all (not shown in FIG. 3). A signal line only consumes energy when if there is a high/low or low/high transition. In that case, it is obviously important whether the temporal preceding value of the same signal line is different to the present value or not.

Since the deep sub-micron signal model has a coupling capacitance that is in the same order of magnitude as the base capacitance, the existence of the coupling capacitance depends on the behavior of the other signal lines and thus it is time dependent. A very important characteristic of the deep sub-micron bus model is that the applicable capacitance and, consequently, the corresponding energy consumption for transmitting information via a certain signal line can vary from time to time (dependent on the other signal lines).

TABLE I

Technology Parameters and Bus Characteristics (per length)

| | |
|---|---|
| Technology | 0.1 µm |
| $V_{DD}$ | 1.2 V |
| Base capacitance $C'_B$ = min ($\Sigma C'_i$) | 44.22 pF/m |
| max ($\Sigma C'_i$) | 631.3 pF/m |
| Coupling capacitance of two adjacent bus lines $C'_{Ci,i+1}$ | 35.89 pF/m |
| $C'_{0\ min}$ | 0.67 pF/m |
| $C'_{N/2\ max}$ | 40.11 pF/m |
| $C'_{N/2\ max}/C'_{0\ min}$ | 59.87 × |

TABLE I presents an overview of the characteristics in terms of actual capacitances. The values are based on a 0.1 µm, 1.2V CMOS process and have been obtained by simulations using deep sub micron signal line model. It is interesting to see that $\Sigma C'_i/\text{min } \Sigma C'_i \approx 15$. That means, that there is a spread of 15 times for the power consumption of transmitting one 32-bit word via the adjacent signal lines. In the worst case there is:

$$C'_{imax} = C'_B + \sum_{\forall j \in \{0,...,N-1\}, j \neq i} C_{Ci}(x_{i,j}, s\_fct(|i, j|)), \quad \text{Equation (5A)}$$

$$\forall_{j \in \{0,...,N-1\}, j \neq i} x_{i,j} = 1$$

whereas in the best case is:

$$C'_{imin} = C'_B + \sum_{\forall j \in \{0,...,N-1\}, j \neq i} C_{Ci}(x_{i,j}, s\_fct(|i, j|)), \quad \text{Equation (5 B)}$$

$$\forall_{j \in \{0,...,N-1\}, j \neq i} x_{i,j} = 0$$

$$C'_{imin} = C'_B$$

Figure 4:
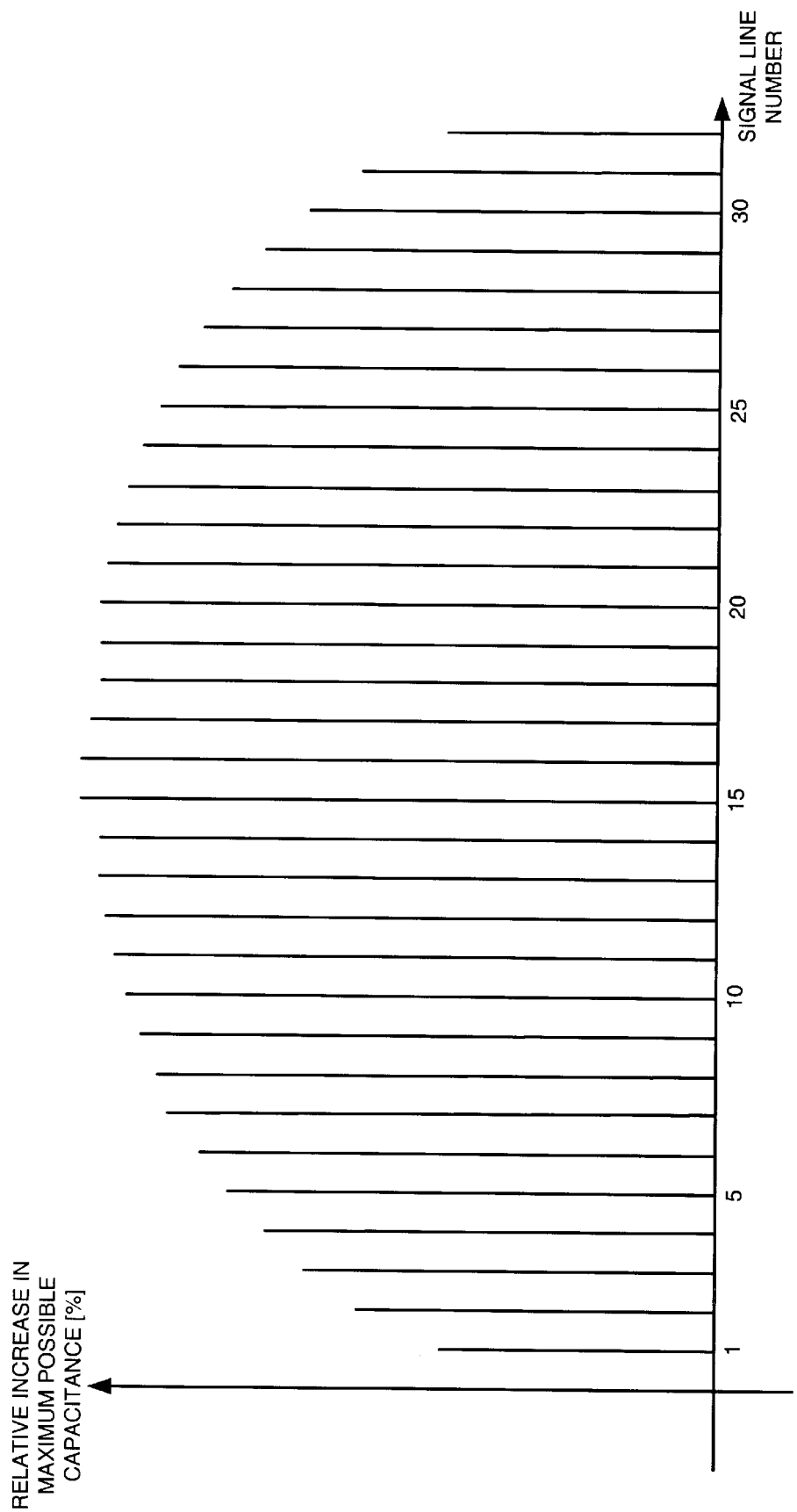
FIG. 4 illustrates the relative increase of maximum possible coupling capacitances between several adjacent signal lines.

Then, there is the $C'_{N/2\ max}/C'_{0\ min}$ relationship of capacitances shown where not only minimum and maximum cases for one and the same signal line are compared but actually for two different signal lines. Referring to FIG. 4, the normalized maximum capacitance increases for all bit lines of an exemplary 32-bit bus are shown. That means the maximum capacitance of each bit line (according to Equation 3) has been set in relationship to the smallest maximum capacitance of all bit lines:

$$\min(\forall_{i \in \{0,...,N-1\}} C'_{i\ max}) \quad \text{Equation (6)}$$

FIG. 4 shows the increase in maximum capacitance of a bit line. The maximum capacitance of bit line 16 is around twenty-five percent larger than the maximum capacitance of bit line 0 or bit line 31. The explanation can be found in Equation 1 where the distance between bus lines has an impact on the size of a component of a coupling capacitance. It is also obvious that the bit lines on the border have the smallest maximum capacitances (see Equation 6) since they have a smaller number of close neighbor lines that can account for large coupling capacitances. The entry $C'_{N/2\ max}/C'_{0\ min}$ in TABLE I shows both the minimum and maximum effect of Equations 3 and 4, plus the spatial effect of where the bus line is located as just discussed. The relationship is as large as 59.87. That characteristic represents a potential for power/energy minimization.

The most important characteristic uncovered is the applicable signal line capacitances vary (except for the constant portion of the base capacitance) throughout time due to (1) where (i.e. which signal line) on the group of signal lines specific information is sent, and (2) whether other signal lines in the group of signal lines switch in respect to a particular signal line. This is different to the behavior of a non-deep sub-micron design where it only matters how many signal lines switch simultaneously.

Figure 5:
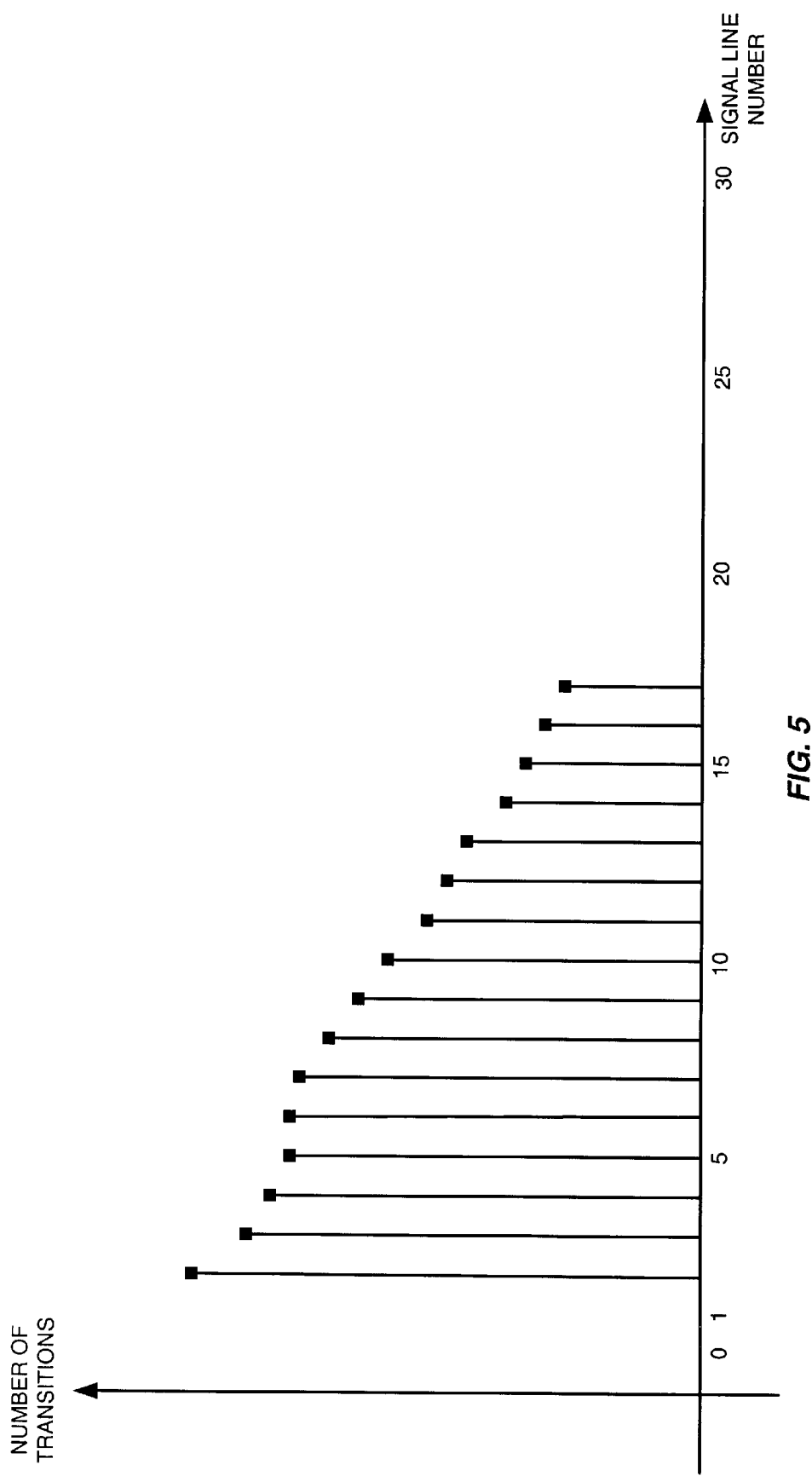
FIG. 5 illustrates the cumulative amounts of address bit line transitions for an exemplary application.

There are characteristics of signal line transactions that are common or at least similar to any transaction that can exploited for power/energy minimization. For example, referring to FIG. 5, the number of transitions that occurred on an address bus during execution of an application is shown. A 32-bit address bus is the signal line group being analyzed in this example, and the transitions for all address bus lines are shown. Address bus lines 0 and 1 have no transitions at all since only 32-bit word accesses are performed. Furthermore, as can be seen, address bus line 2 is switching most often, followed by address bus line 3, and so forth. The address bus line with the smallest number of transitions not equal to zero is address bus line 17. Since these are instruction address accesses, the following conclusions can be made:
1. The address space of the application is $2^{17}$ bytes wide. Please note that the address bus line transitions cannot show where in the address space the program is located because those bits that never change have zero transitions.
2. FIG. 5 shows a decreasing number of transitions with increasing address bus line designation is similar to the profile of a counter: it has many transitions on lower address line bits and less on higher address line bits. This is a characteristic of executing a program, since the instructions are obviously sequentially stored in memory. As expected, the profile is not as regular as a counter's profile because a program executes loops and subroutines, for example.

Transition profiles of other applications look similar with the main difference that more or less bit lines show transitions, reflecting the different address space (i.e., size) of a program/process. Comparing FIG. 5 to FIG. 4, the following holds:
1. The exemplary application (FIG. 5) does not use many of the address bus bit lines, although the relative capacitance profile shown in FIG. 4 suggests that it might be less power/energy consuming to use the outer address bit lines (i.e., address bit lines 0, 1, 30, 31); and 2. All switching bit lines are adjacent, though it might be less power/energy consuming to have some "unused" lines interposed between the actively switching address bit lines in order to take advantage of the shield effect.

The power/energy consumption can be reduced by transmitting logical bits through signal lines other than what their bit numbers suggest (e.g., transmitting bit 7 of a word via signal line 13, instead of signal line 7). According to the deep sub-micron model, there can be a very large number of different $C_{Ci}$ (see Equation 2) when transmitting data. Only the best assignment of a signal to a signal line will result in the smallest power/energy consumption for transmitting information. The following reasons prevent the best assignment at any time:

1. The complexity prohibits finding the best solution.
2. The lack of a priori knowledge of the bus transactions, i.e., optimization cannot be done off-line, but has to be accomplished on-the-fly (while the system is running).
3. The complexity of the hardware necessary to conduct the encoding schemes cannot grow too large since otherwise the according additional power/energy consumption would exceed the power/energy saved by applying the schemes.

Therefore, only a local optimization can apply to the adjacent signal lines. A window is defined as follows:

$$w_{l,h}(ww) = \{l,h \mid h-l=ww-1, h>l, h, l \geq 0, h, l \leq bw-1\} \quad \text{Equation (7)}$$

with 1, h being the lower and upper border bit positions of the window, respectively, ww is the window size in bits and bw is the signal grouping line size in bits. This definition allows any cross-connection scheme to be used, such as the one that follows:

$$w\_target_{c,b}(ww1) \equiv w\_source_{a,b}(ww1) \quad \text{Equation (8)}$$

Figure 6:
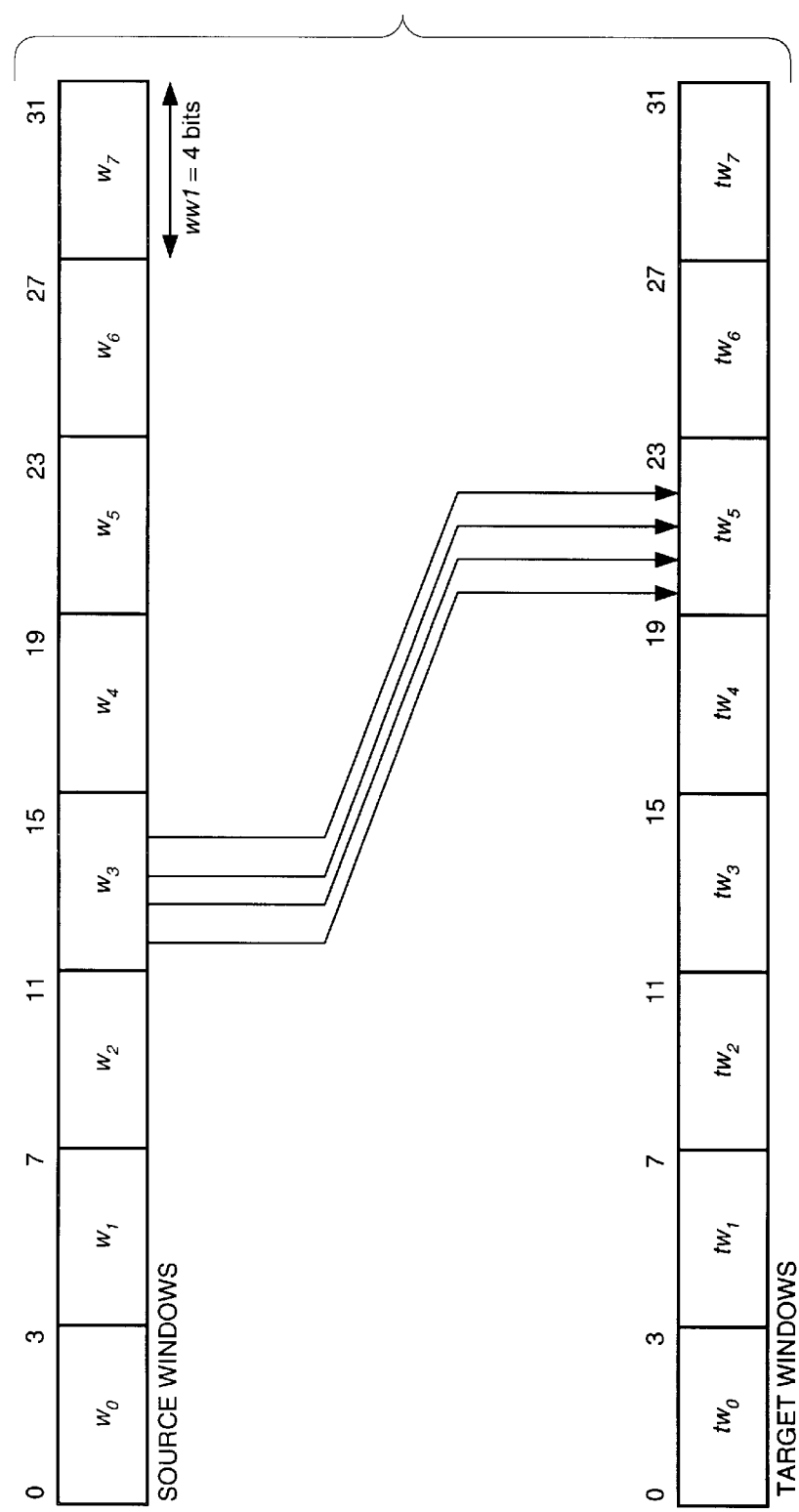
FIG. 6 illustrates a cross connection between a set of source windows and a set of target windows.

Referring to FIG. 6, it is assumed that a straight assignment is performed, i.e., the lowest bit of a source window is assigned to the lowest bit of a target window. Bits 12–15 from the source window are cross-connected to bits 20–23 of the target window. Since the window size should have the same size (this simplifies the implementation since the respective hardware is the same for each cross connection), it is essential that the following equation is satisfied:

$$bw \bmod ww = 0 \quad \text{Equation (9)}$$

The constraints on the size of ww are as follows:
1. If the window is too small (e.g., ww=1), the implementation effort might be too high.
2. If the window is too big (e.g., ww=bw/2), the possibilities of assigning windows with high signal transition activity to regions of the signal line grouping (refer to FIG. 4) that are beneficial in terms of low power/energy consumption are too small.

The present invention attempts to ensure that, after the cross-connection assignment, windows with low signal transition activity are separated from windows with high signal transition activity. An assumption is that no single process/program is so large that is consumes all the signal lines that are available for use. In general, this assumption holds true since large applications are typically decomposed into smaller programs and/or processes. For example, if the signal lines in question are address lines, it is a fairly safe assumption that the higher bits of the address lines will switch less often than lower bits of the address lines. As a practical matter, there will be many address lines that switch infrequently (e.g., only once during a context switch between two processes that are located in a quite different address space). Referring to FIG. 5, using the exemplary application shown, address lines 18 to 31 switch infrequently and therefore that region can be split into windows that can do the required task. This also favors the shield effect that was discussed above.

Ideally, the number of signal lines with high signal transition activity is approximately equal to the number of signal lines with almost no signal transition activity, as shown in FIG. 5. As noted earlier, it is atypical that a program/process requires the total number of signal lines available in the underlying hardware. More likely, however, a program/process requires so few signal lines that the majority of the available signal lines are idle. In that case, it would be desirable to separate windows with high signal transition activity as far as possible from each other. This strategy aims at making use of the shield effect as much as possible.

Figure 7A:
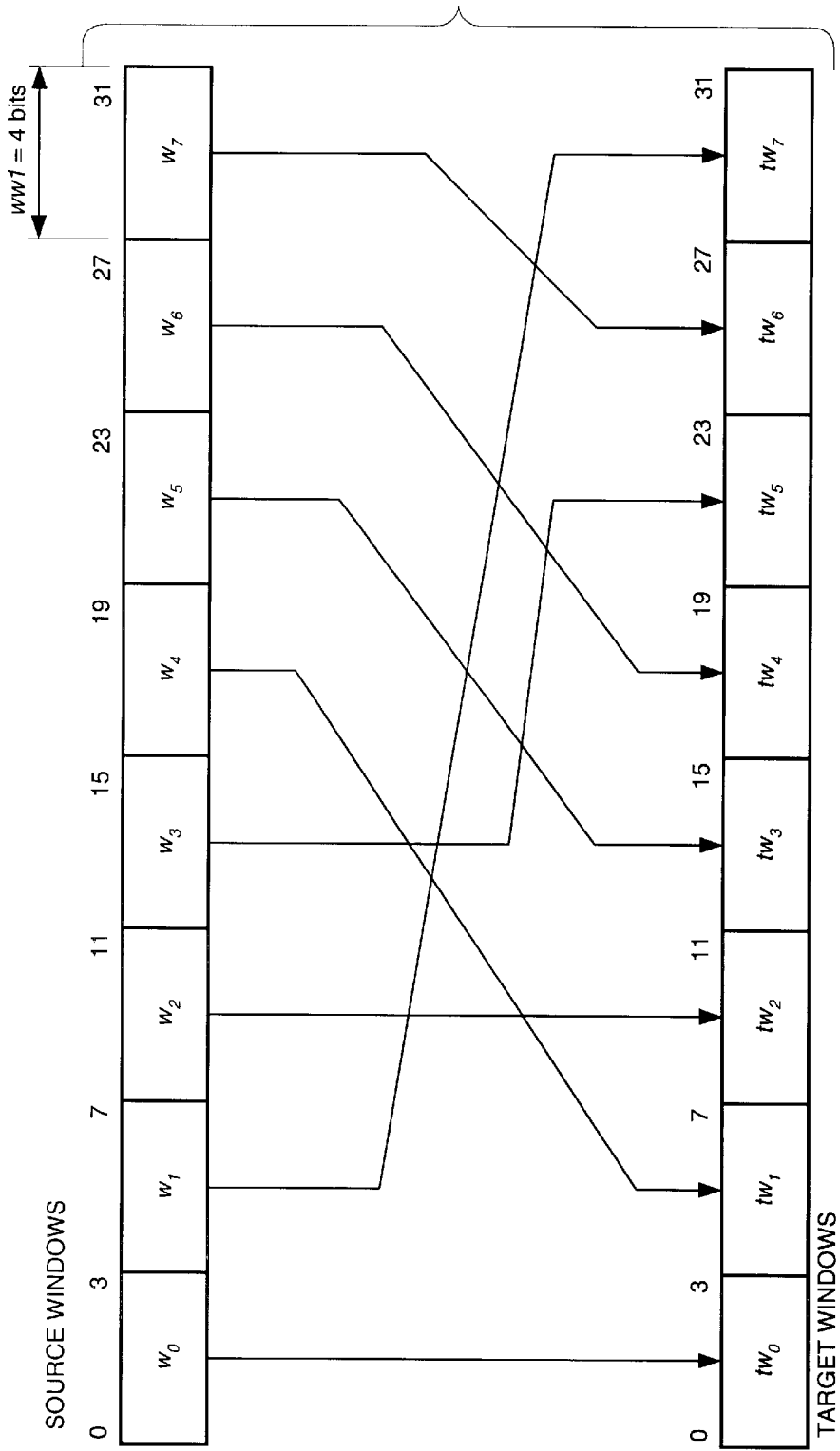
FIG. 7A illustrates a windowing scheme according to the present invention.
Figure 7B:
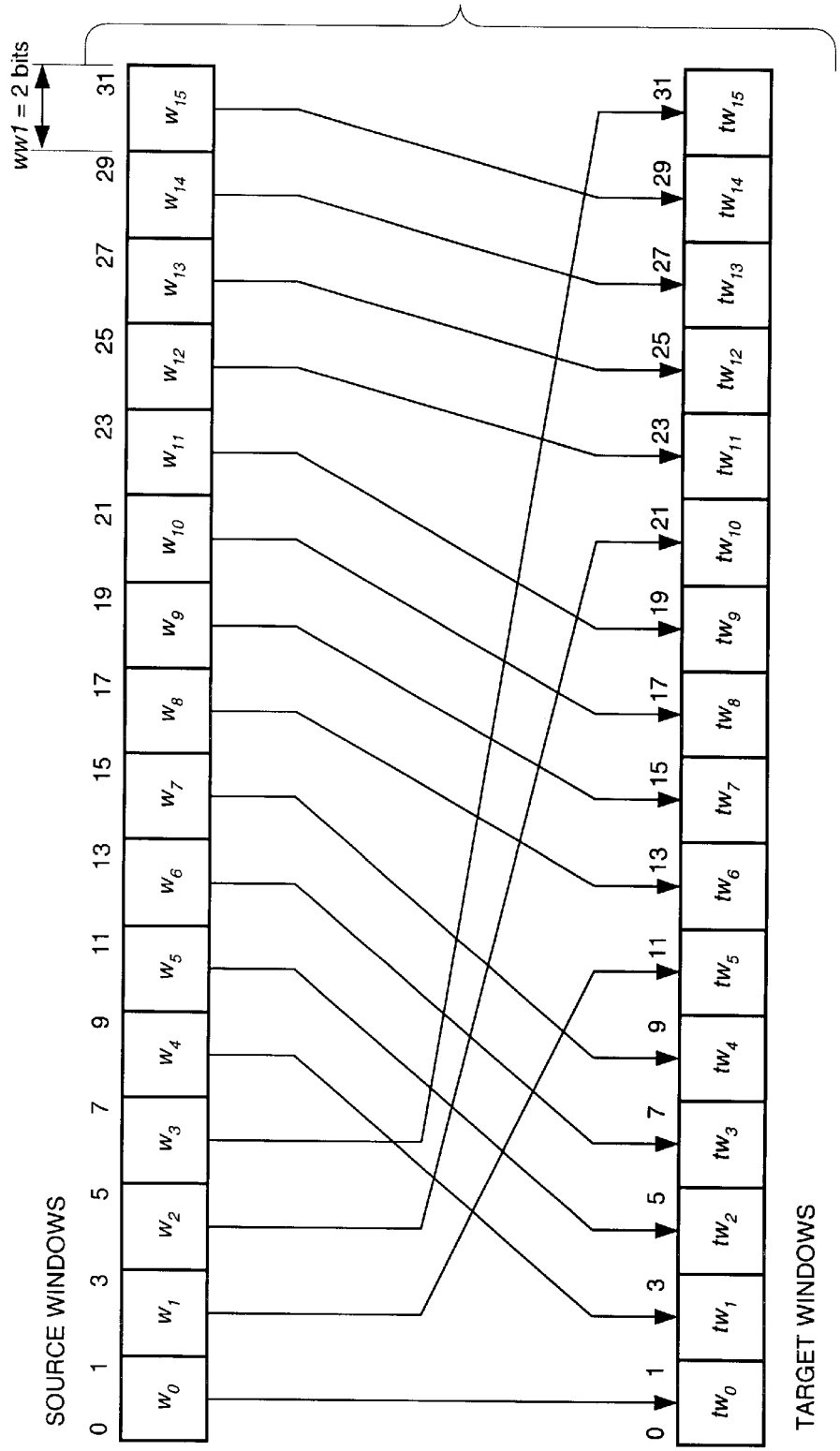
FIG. 7B illustrates a second windowing scheme according to the present invention.

Referring to FIGS. 7A–7C, three windowing schemes are illustrated. The windowing schemes are designed to maximize the shield effect and to reroute signals with high transition activity to signal lines that are expected to be less expensive in terms of power/energy consumption.

The schemes are designed for two different profiles. The windowing scheme in FIG. 7A is better suited to situations where a majority of the signal lines have transition activity. The windowing scheme in FIG. 7B is suited to situations where a minority of signal lines have transition activity, while the remaining majority of the signal lines are hardly used. The windowing scheme in FIG. 7C is an adaptation of the two prior schemes.

Referring to FIG. 7A, source windows $w_0$–$w_3$ have high signal transition activity, while the remaining source windows $w_4$–$w_7$ have little or no signal transition activity. Windows $tw_0$ through $tw_7$ represent the target windows to which the cross-connections are made from the source windows $w_0$ through $w_7$. Please note that the source windows with high signal transition activity are equally distributed amongst the target windows, and thus are separated from each other. In addition, the source windows with the highest number of signal transitions (typically the left-most source windows $w_0$–$w_3$) are distributed to the borders of the signal line grouping. For example, source window $w_2$ is assigned to target window $tw_7$ instead of the closer target window $tw_2$.

Referring to FIG. 7B, this windowing scheme is similar to the scheme illustrated in FIG. 7A, except it is designed for programs/processes with low amounts of signal transition activity. Source windows $w_0$–$w_3$ have high signal transition activity, while the remaining source windows $w_4$–$w_{15}$ have little or no signal transition activity. In this windowing scheme, the source windows with little or no signal transition activity are grouped together in blocks that are larger than the individual source windows with high signal transition activity. Accordingly, more windows having less signal transition activity are equally distributed between the windows with high signal transition activity.

Referring to FIG. 7C, this windowing scheme is similar to the scheme illustrated in FIG. 7A. Source windows $w_0$–$w_1$ have high signal transition activity, while the remaining source windows $w_2$–$w_5$ have little or no signal transition activity. In this scheme, the source windows with the highest number of signal transitions (i.e., the left-most source windows $w_0$–$w_1$) are distributed to the borders of the signal line grouping, while the remaining windows with low signal transition activity are interposed between them. For example, source window $w_1$ is assigned to target window $tw_4$ instead of the closer target window $tw_1$.

In terms of implementation, the encoding interface of the present invention will support the windowing schemes. The present invention switches between the schemes when a new program/process is invoked that requires more or less signal line space. Therefore, during the execution of a specific program/process, no switching between the windowing schemes occurs.

The above described windowing schemes shield windows with high signal transition activity from each other, resulting in minimization of coupling capacitances. However, the transition activities and coupling capacitance effects within a particular window need to be minimized as well, in addition to assigning high activity windows to low capacitance areas of the signal line grouping minimizes potential power/energy consumption.

An Extended Transition Activity Measure (ETAM) for a window $w_{l,h}(ww)$ must be defined (see in Equation 7). In order to make the formula easier to read, w is used to denote the window. Furthermore, assume that $b_x$ is the $x^{th}$ bit within a window with $B_x$ being the value of that bit (i.e., $B_x \in \{0, 1\}$). Thus, the ETAM measure is defined as follows:

$$ETAM(w) = \sum_{\forall b_i \in w} \left( (B_i \oplus B_i^{-1}) + (B_i \oplus B_i^{-1}) \cdot \sum_{\forall b_j \in w, b_j \neq b_i} (B_i \oplus B_j) \right) \quad \text{Equation (10)}$$

$B_i^{-1}$ gives the value of signal $b_i$ at time t−1, i.e., the temporal preceding value. Thus, $B_i \oplus B_i^{-1}$ determines whether signal $b_i$ has a high/low or low/high transition, or not. Accordingly, this specific signal will contribute to the ETAM measure.

Figure 8A:
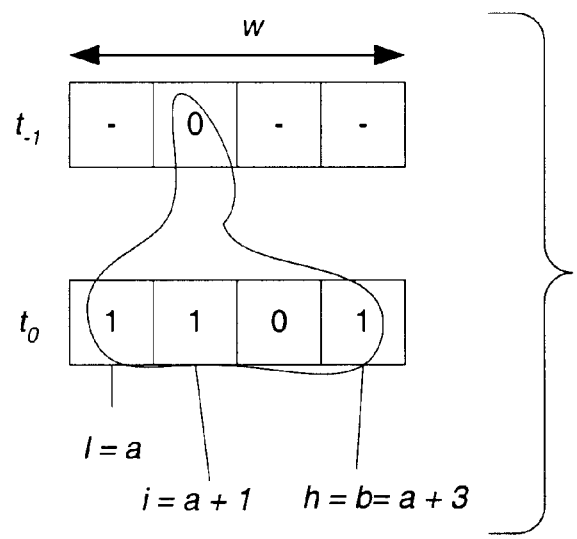
FIGS. 8A–8D illustrates the bit positioning used to calculate an extended transition activity measurement.
Figure 8B:
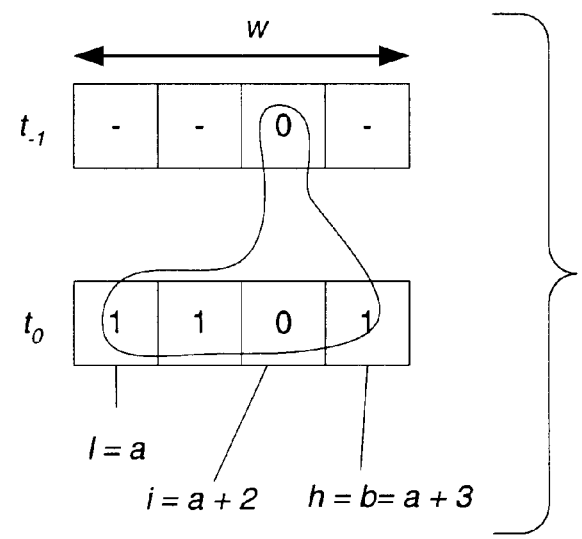

Referring to FIG. 8A–8B, it is illustrated how ETAM is measured using an example of two stages. In FIG. 8A, in the first stage, the portion of the ETAM measure contributed by i=a+1 is demonstrated. The dotted line shows the scope that is important for the calculation of the respective ETAM portion. At $t_{-1}$, the bit being viewed is set to "0" and at $t_0$, the bit has transitioned to a "1". Since the bit at i=a+1 is "1", the number of bits in the window that are different are counted. In this case, the number of bits that are different is two (i.e., the "0" bit at i=a+2 and the "0" bit at i=a+1 at $t_0$). Referring to FIG. 8B, in the case of i=a+2, the respective ETAM portion is 0 since the bit being viewed does not perform a transition. It is very important to note that ETAM as shown does NOT violate the causality principle, as it might seem from the FIGS. 8A–8B. Therefore, please note that the collection of signals referring to time $t_{-1}$ is stored in a register. But the collection of signals for time $t_0$ is stored in a register since the collection of signals is not yet output (e.g., it is just in the I/O register of a device) and thus ETAM does work as intended by Equation 10.

Figure 8C:
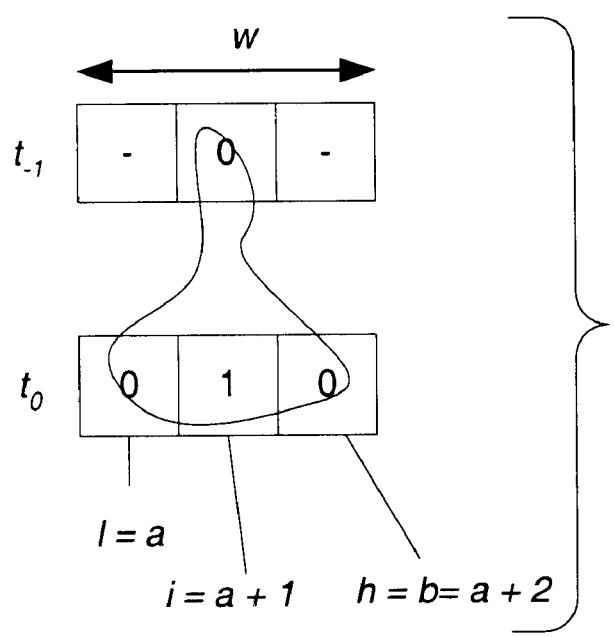
Figure 8D:
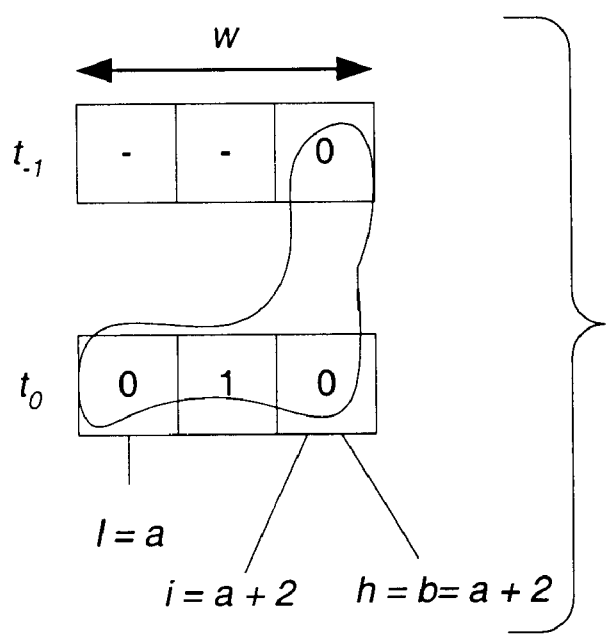

For FIG. 8C, the ETAM value for the bit under review would be equal to three (i.e., the transition from "0" to "1" at i=a+1, and the "0" bits at l=a and b=a+2). For FIG. 8D, the ETAM value for the bit under review (i.e., b=a+2) would be equal to one (i.e., the "1" bit at i=a+1).

According to Equation 10, the question of whether every signal associated with the signal under review is contributes 1 or 0 to the maximum value of ETAM is dependent upon whether the signal under review is different in value to the associated signals. The fact that each contribution is equally sized (1 or 0 with no other values allowed) is justified since the base capacitance is approximately the same as compared to coupling capacitances of the closest neighbors (e.g., a maximum of three left or right neighbors in a 4-bit window).

Thus, the base capacitance and the coupling capacitance contribute in substantially equal amounts to the power/energy consumption. Furthermore, the shield effect makes the more distant coupling capacitances negligible. This is the justification to use a window size of four bits. Also, this window size results in a reasonable hardware amount for the implementation.

Also, ETAM provides a measure as to whether the information in the window should be inverted or not. ETAM is able to measure the impact of coupling capacitances. A Hamming Distance measure, as used for regular invert schemes, would not lead to a reasonable improvement in power/energy consumption. Instead, it would only reduce the number of transitions. But the number of transitions does not necessarily reflect the amount of power/energy that is consumed.

Figure 9A:
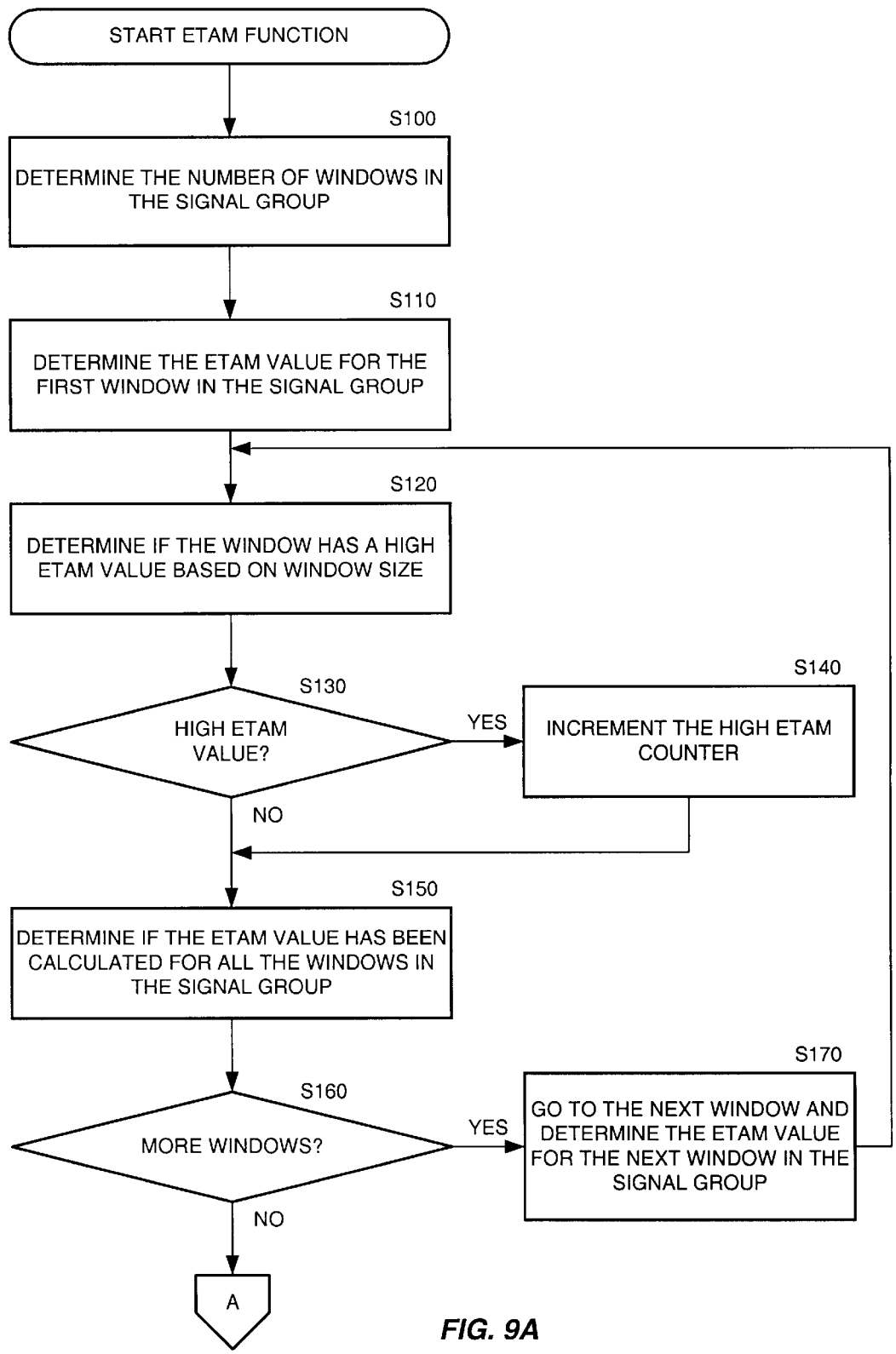
FIGS. 9A–9B illustrates an exemplary process flow for calculating an extended transition activity measurement.
Figure 9B:
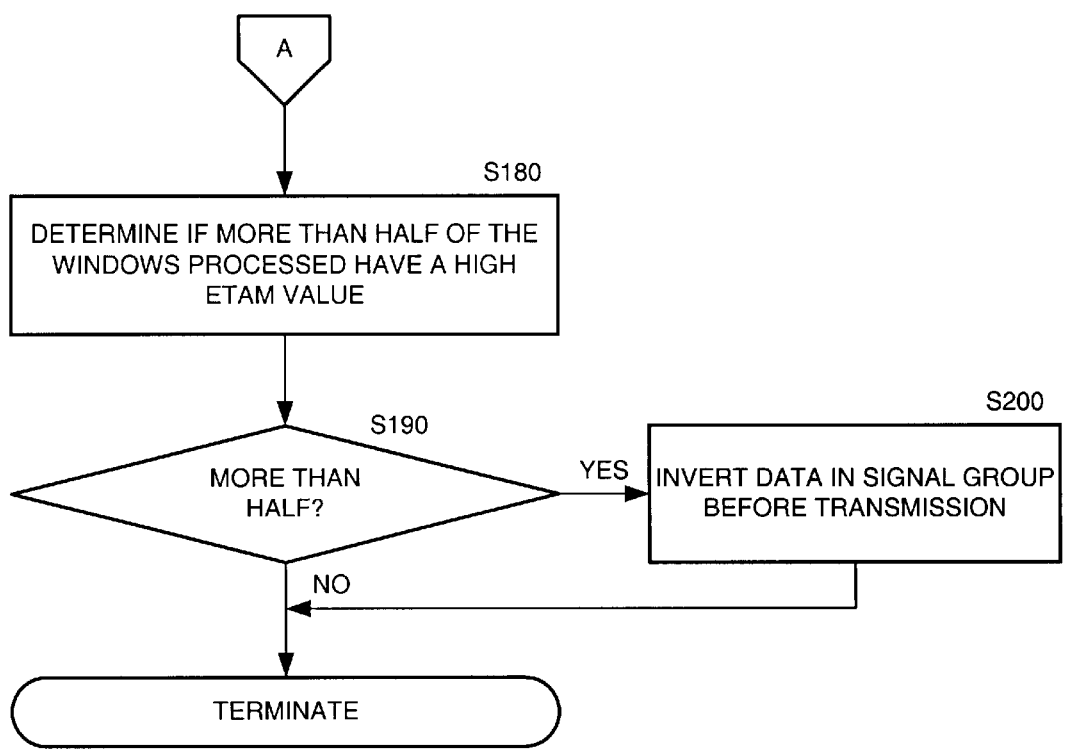

Referring to FIGS. 9A–9B, the process flow of an ETAM measurement as applied to a data set will be explained in greater detail. Please note that, in an actual implementation, the function of calculating the ETAM value for each window would be done in parallel for reasons of speed. FIGS. 9A–9B illustrate the ETAM calculation process in serial fashion for ease of understanding. At S100, a determination is made of the number of windows in a signal group. At S110, the ETAM for the first window in the signal group is measured, and the obtained ETAM measurement is stored. At S120, a determination is made whether the ETAM measurement is a high ETAM value. If the ETAM measurement exceeds half of the maximum value for the window (depending on the window size ww), the ETAM measurement is considered a high ETAM value. At S140, if the ETAM measurement is a high ETAM value, the high ETAM counter is incremented.

At S150, a determination is made if the ETAM measurement has been taken for all the windows in the signal group. If more windows in the signal group remain to be measured, at S170, the process proceeds to the next window to be processed, and the process resumes at S120. Referring to FIG. 9B, at S180, a determination is made if more than one-half of the windows measured have a high ETAM value. Typically, this is done by checking the high ETAM counter against the number of windows divided by two. If more than one-half of the windows processed have a high ETAM measurement, then, at S200, the signal information in all the windows is inverted. Please note that decoding can be done inversely. Only one extra signal line is used for inverting the signals since all windows will be inverted or not (i.e., majority vote amongst the windows controls).

Figure 10A:
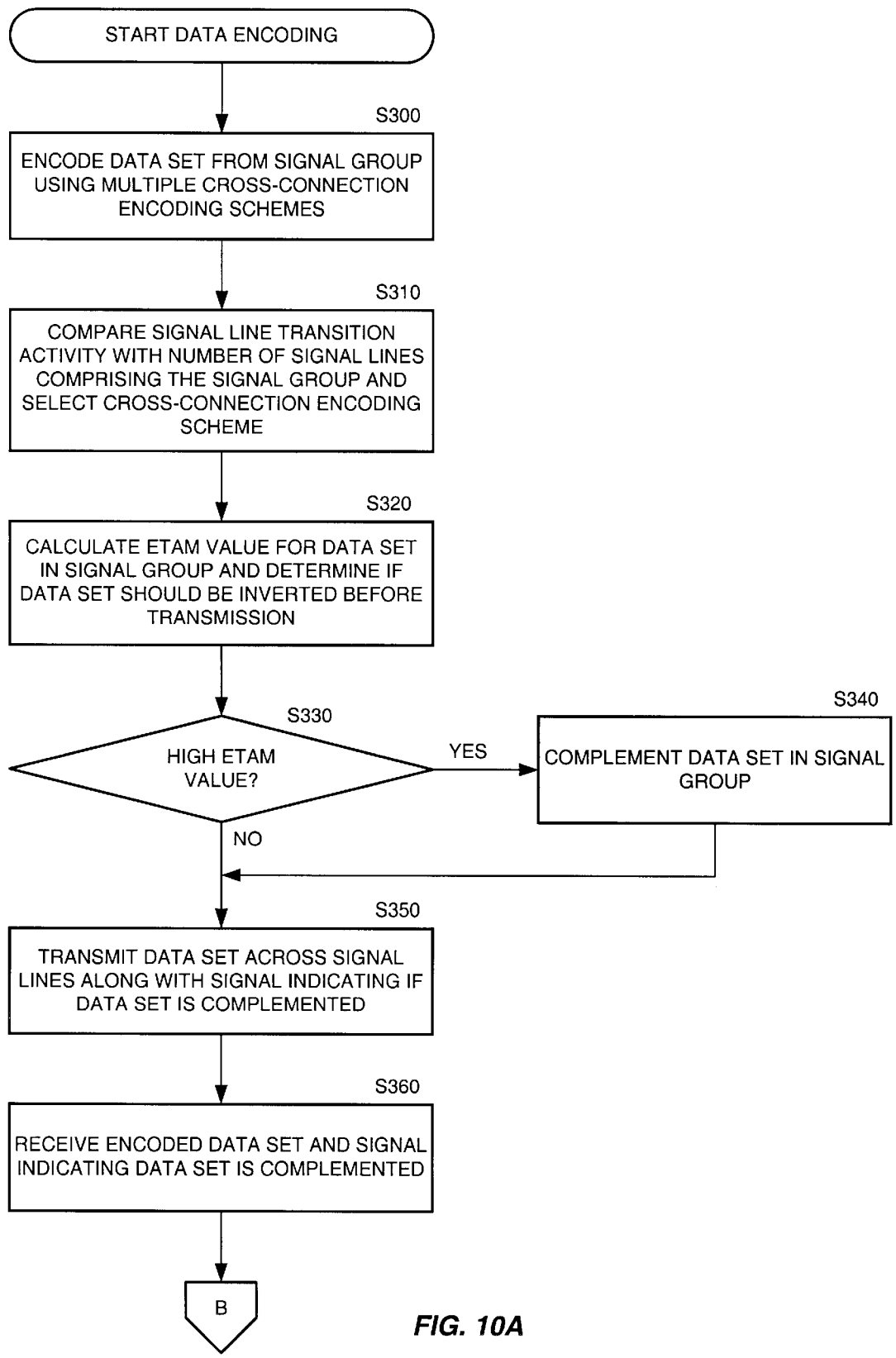
FIGS. 10A–10B illustrates a first embodiment for encoding and decoding a group of signals according to the present invention.
Figure 10B:
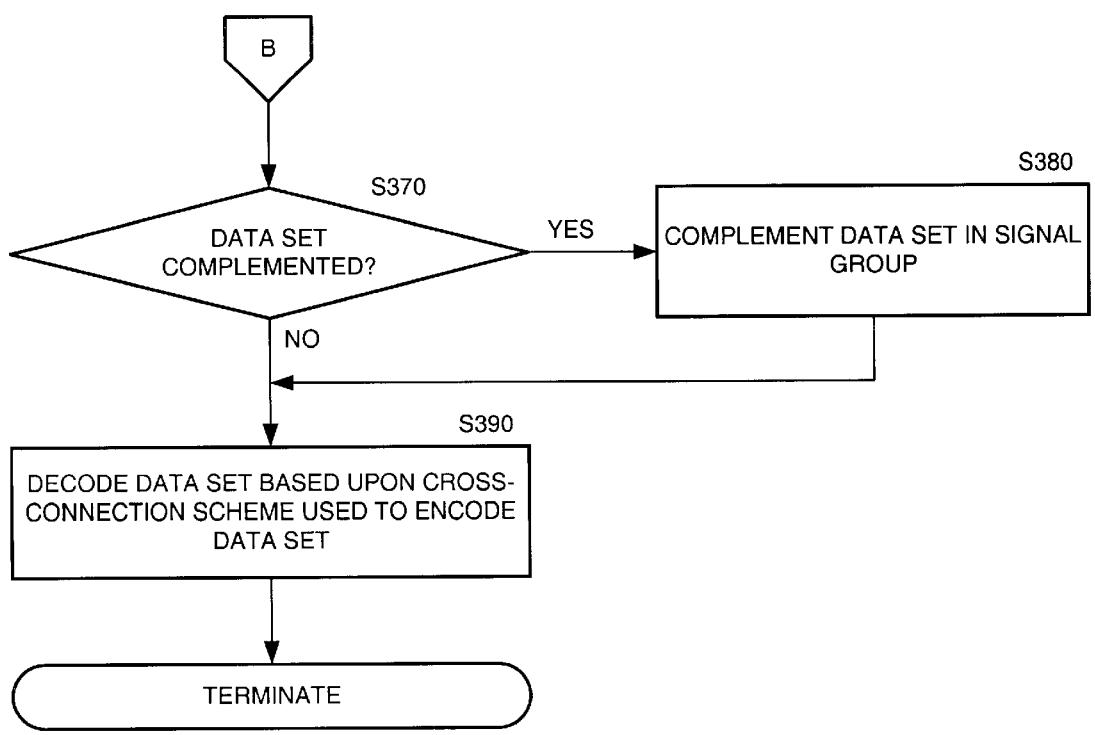

Referring to FIGS. 10A–10B, the signal-encoding process of the present invention will be explained in detail. As with the ETAM measurement process described above, please note that, in an actual implementation, the signal-encoding process would be done in hardware for reasons of speed. However, the signal-encoding process can be implemented in software as well. At S300, the data set from the signal group is encoded using multiple cross-connection encoding schemes. The multiple cross-connection encoding schemes are those that were described earlier. At S310, the signal line transition activity is compared to the number of signal lines that comprise the signal group, and based on that comparison, one of the multiple cross-connection encoding schemes is selected. At S320, the ETAM value for the data set in the signal line group is calculated. As described in FIGS. 9A–9B, this ETAM value is used to determine if the data set in the signal line group needs to be complemented before transmission. At S340, if the ETAM value is high, the data set in the signal line group is complemented. As noted above, whether or not the ETAM value for a particular data set compels complementing is based on the window size for the signal group.

At S350, the encoded data set is transmitted across the signal lines, along with an invert signal that indicates whether or not the encoded data set traversing the signal lines is complemented. At S360, the encoded data set and the invert signal indicating if the encoded data set is complemented are received. Referring to FIG. 10B, if the invert signal indicates that the received encoded data set is complemented, at S380, the received encoded data set is complemented again. At S390, the encoded data set is decoded using the inverse of the cross-connection encoding scheme employed to encode the data at S300.

Figure 11:
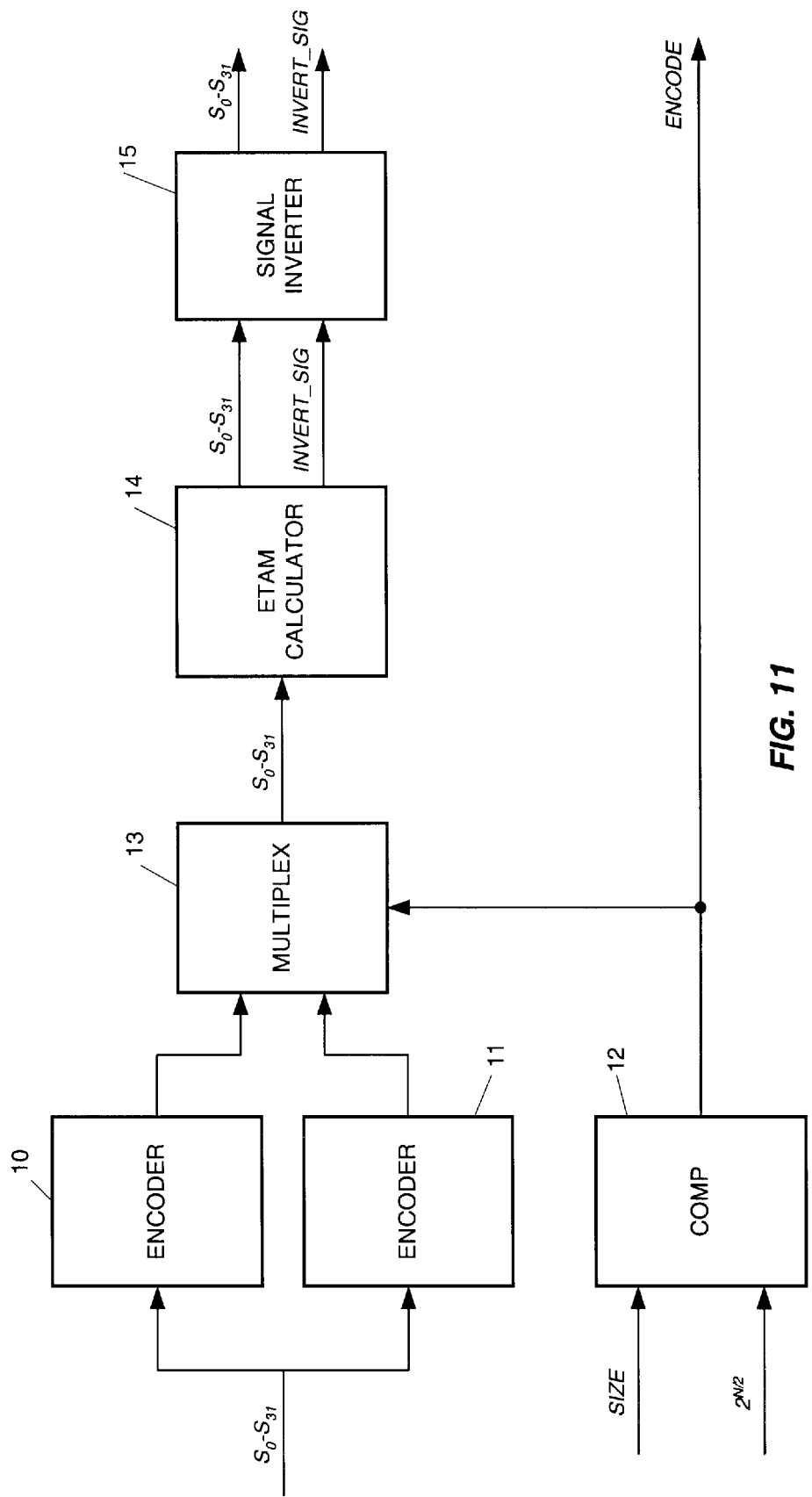
FIG. 11 illustrates a second embodiment for encoding and decoding a group of signals according to the present invention.
Figure 17:
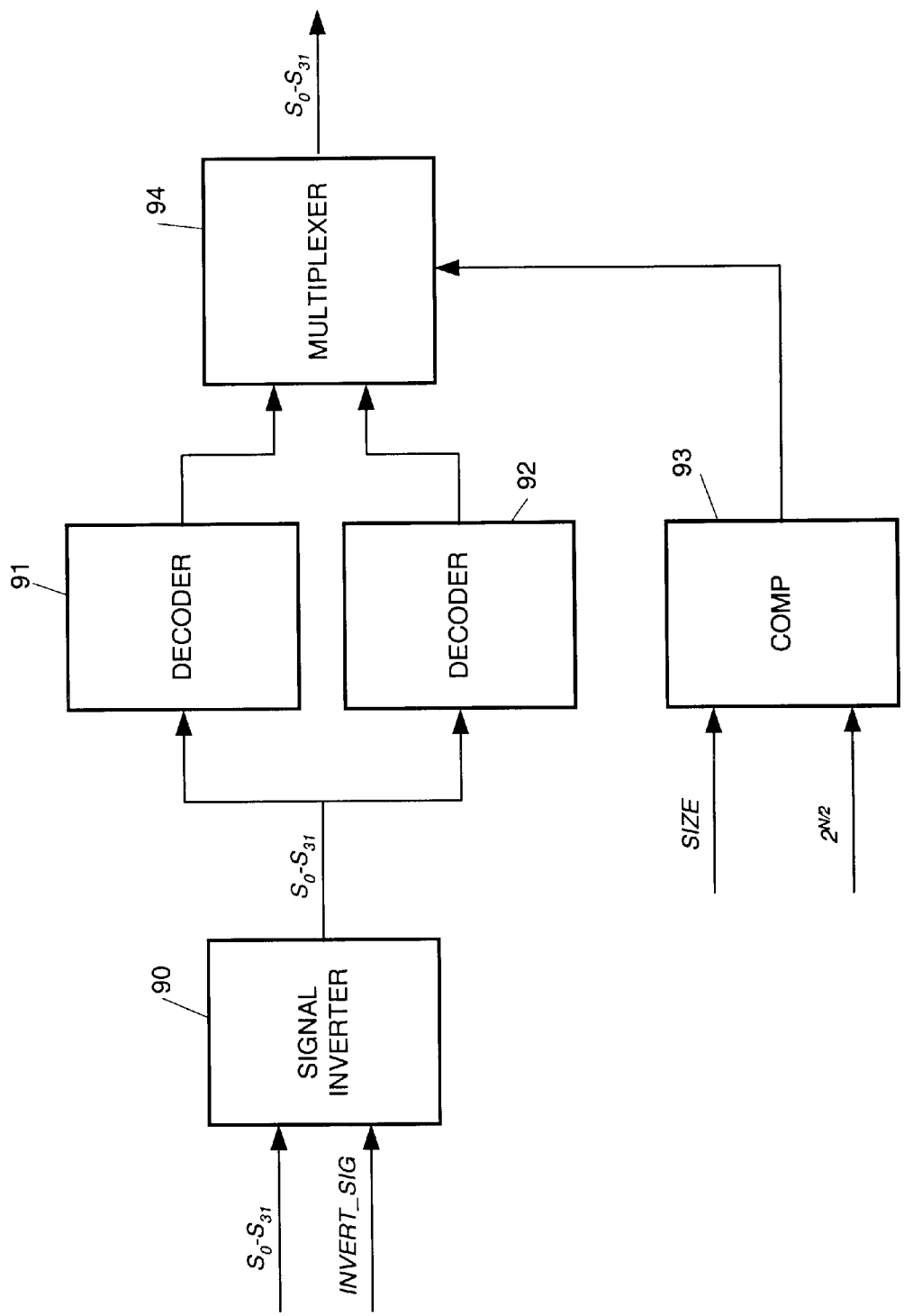
FIG. 17 illustrates an embodiment of a signal decoding interface according to the present invention.
Figure 18:
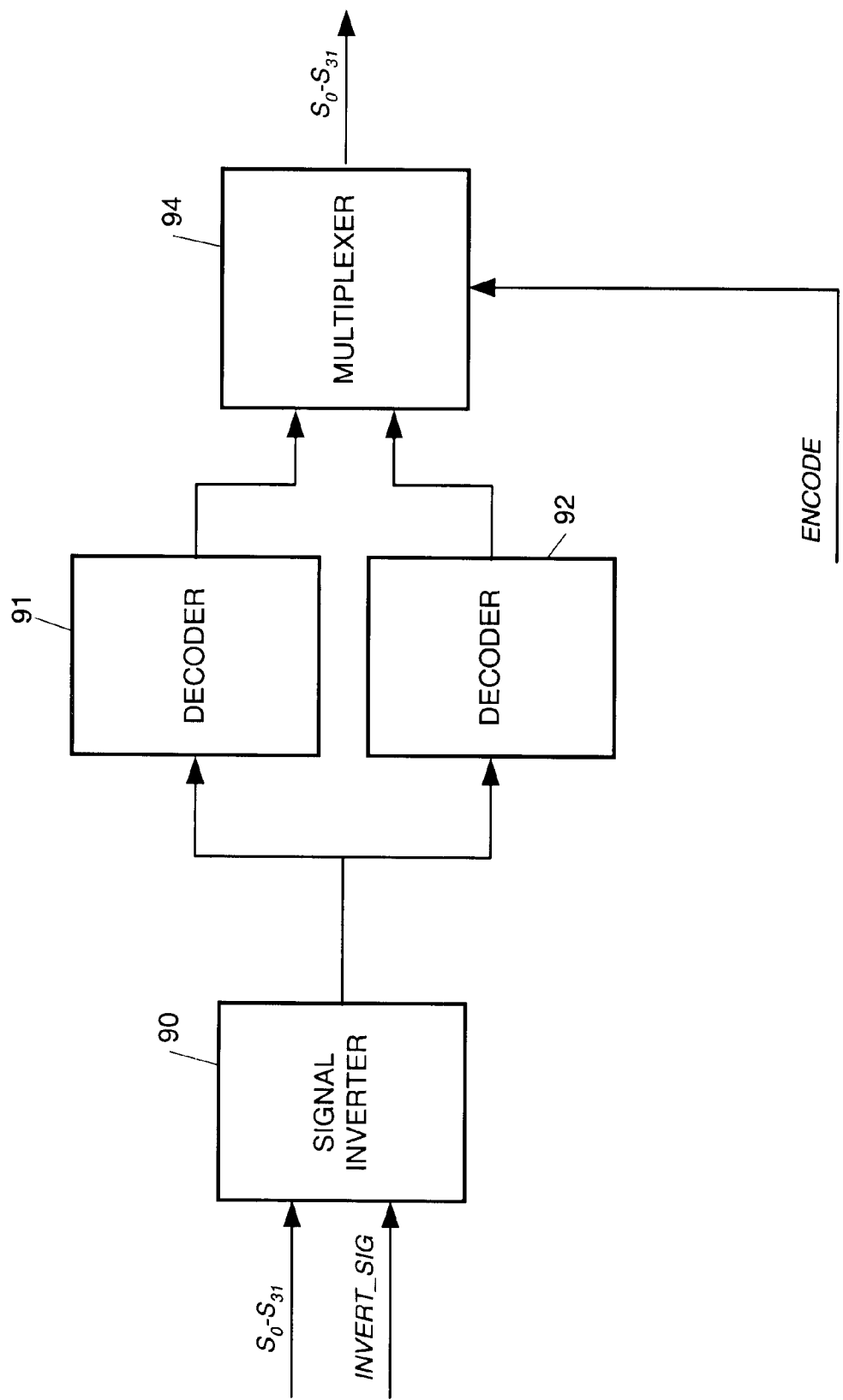
FIG. 18 illustrates a second embodiment of a signal decoding interface according to the present invention.

Referring to FIG. 11, an embodiment of a signal-encoding interface that implements the signal windowing and ETAM is illustrated. For the sake of illustration, the signal group that is input into the signal-encoding interface is 32-bits wide ($S_0$–$S_{31}$). The signal-encoding interface of the present invention is not limited to a 32-bit bus, and the concepts of the signal-encoding interface are applicable to any size or type of signal group (i.e., data bus, address bus, control signal bus, etc.). The signal-encoding interface is comprised of a plurality of encoders 10–11, a comparator 12, a multiplexer 13, an ETAM calculation device 14 and a signal inverter 15. Signal-decoding interfaces according to the present invention are illustrated in FIGS. 17–18. These signal-decoding interfaces will be described in greater detail below.

Referring to FIG. 11, the plurality of encoders 10–11 implements the encoding schemes that were discussed previously. That is, each encoder implements one of the cross-connection schemes shown in FIGS. 7A–7C. As previously discussed, each cross-connection scheme is suited to a particular type of application in terms of the number of signal lines that are exercised. The comparator 12 makes the determination of which encoder 10–11 will be used for a particular application. Typically, this depends on the size of the signal grouping related to the presently executing program/process. One of the inputs to the comparator 12 is the size of the application and/or task that is executing (i.e., SIZE). The other input to the comparator 12 is the size of the signal grouping being used (i.e., $2^{N/2}$). The comparator 12 needs to know the size of the signal grouping verses the size of the application/task in order to select which encoder 10–11 is used for the application/task. The comparator 12 activates either windowing scheme by switching the multiplexer 13 accordingly. The switching is therefore only done once, and usually when a context switch between two differently sized program/processes occurs. The comparator also outputs the selection signal to the signal-decoding interface so the selected windowing scheme can be decoded properly.

The encoded data signals are output from multiplexer 13 and input into the ETAM calculation device 14. The ETAM calculation device 14 does the ETAM calculations and makes a determination if the current set of encoded data signals should be complemented. The ETAM calculation device 14 does not do any further encoding of the encoded data signals received from the multiplexer 13. The ETAM calculation device 14 outputs the encoded data signals and an invert signal INVERT_SIG to the signal inverter 15.

The signal inverter 15 receives the encoded data signals from the ETAM calculation device 14, along with the signal INVERT_SIG. If the ETAM calculation device 14 determined that complementing the encoded data signals was not required, the signal inverter 15 outputs the encoded data signals along with the signal INVERT_SIG that indicates to the signal-decoding interface that the incoming set of encoded data signals are not complemented. Conversely, if the ETAM calculation device 14 determined that complementing the encoded data signals is required, the signal inverter 15 complements the encoded data signals and outputs the encoded data signals along with the signal INVERT_SIG indicating to the signal-decoding interface that the incoming set of encoded data signals are complemented.

Figure 12:
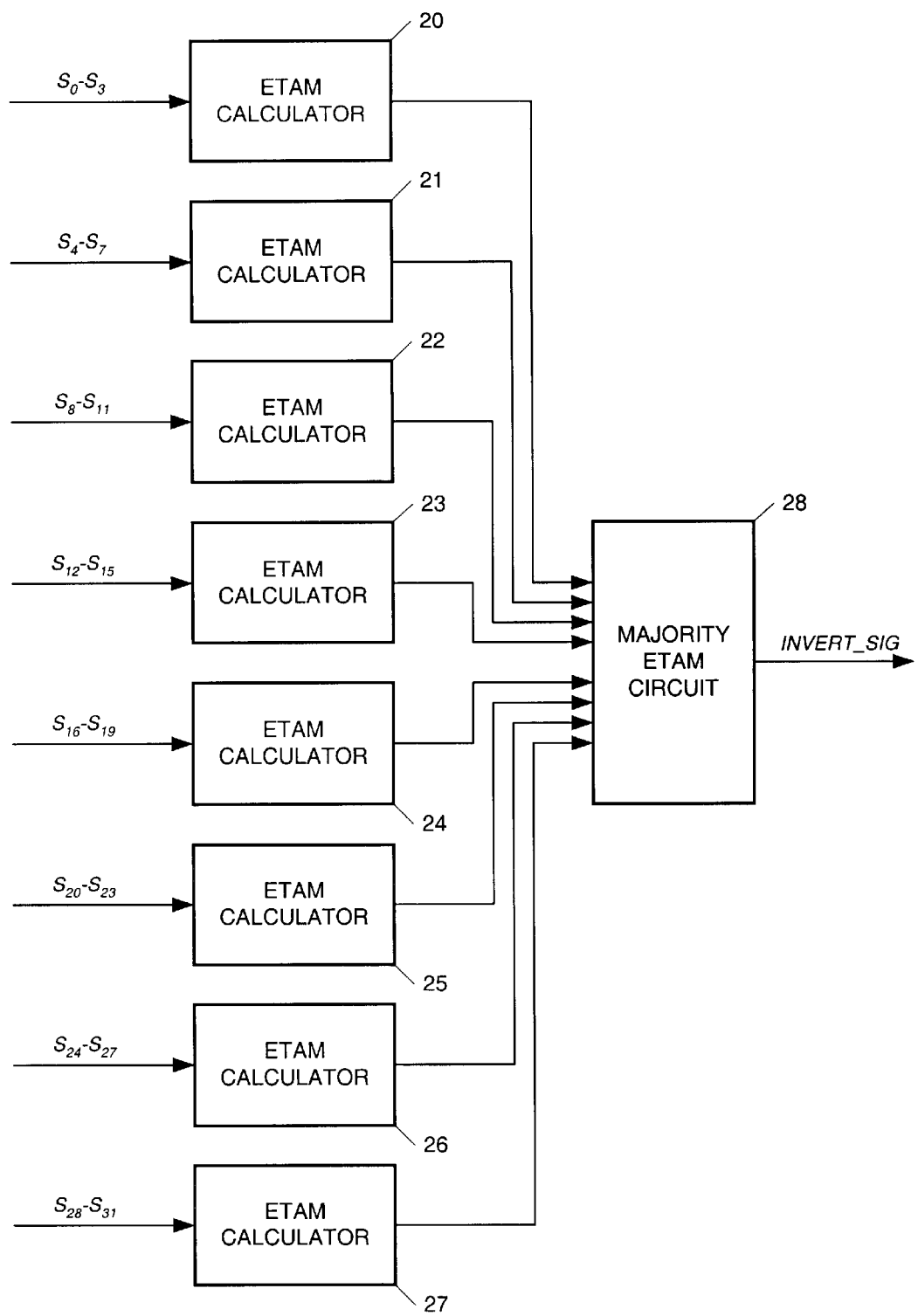
FIG. 12 illustrates the extended transition activity measurement calculators and majority determination circuit for an exemplary 32-bit signal group.

Referring to FIGS. 12–16, the ETAM calculation device 14 will be described in greater detail. Referring to FIG. 12, the exemplary 32-bit signal group has been decomposed into eight windows, each window comprising four bits. Therefore, the ETAM calculator circuits 20–27 are required to handle the ETAM measurements for the exemplary 32-bit signal group. Each ETAM calculator circuit 20–27 outputs a signal that indicates if the ETAM measurement for that particular window is a high ETAM value. The output signal from each ETAM calculator circuit 20–27 is input into a majority ETAM circuit 28. The majority ETAM circuit 28 collects these inputs and determines if a majority of the windows have voted for complementing the encoded data signals $S_0$–$S_{31}$. Thus, besides the encoded signal lines, there is a signal INVERT_SIG (i.e., the output of the majority ETAM circuit 28) that is used for the signal-decoding interface to properly decode the encoded signal lines. Please note that encoding/decoding is done on the fly (i.e., it does not cost an additional clock cycle).

The implementation of the ETAM calculator circuit for a four-bit window will be described in greater detail. Please note that the concepts used to implement a four-bit window are applicable to windows of any size. Starting with Equation 11, it can be rewritten as follows:

$$ETAM(w) = \sum_{\forall b_i \in w} \left( (B_i \oplus B_i^{-1}) \cdot \left( 1 + \sum_{\forall b_j \in w, b_j \neq b_i} (B_i \oplus B_j) \right) \right) \qquad \text{Equation (11)}$$

It can also be rewritten in a more compact form by introducing $S_i$, and Equation 11 can be rewritten as follows:

$$ETAM(w) = \sum_{\forall b_i \in w} ((B_i \oplus B_i^{-1}) \cdot (1 + S_i)) \qquad \text{Equation (12)}$$

Considering the case w=4, there are eight windows eligible for the ETAM calculation (assuming the exemplary 32-bit signal grouping). TABLE II shows the maximum values for the ETAM for all sixteen different cases of $B_i$ values. The first four columns show the different bit combinations of $B_i$ and the next four columns show the values of the 1+$S_i$ as intermediate values for the ETAM calculation shown in Equation 10. The final value of the ETAM depends on the values of $B_i^{-1} \oplus B_i$ (see Equation 12) and the final value of ETAM will be a maximum value when all $B_i^{-1} \oplus B_i$ equal to 1. Therefore, the last column shows the maximum value that the ETAM will carry if all $B_i^{-1}$ are such that all instances of $B_i^{-1} \oplus B_i = 1$. For the exemplary four-bit window, the maximum ETAM is twelve. As described in FIGS. 9A–9B, a "1" must be output whenever the ETAM value is greater than six (i.e., max((ETAM)/2). For ETAM=6, it does not matter whether the signals are complemented or not. In order to simplify the design, in some cases where ETAM=6, the signals will be complemented, and in other cases, the signals will not be complemented.

TABLE II

| $B_0$ | $B_1$ | $B_2$ | $B_3$ | $1 + S_0$ | $1 + S_1$ | $1 + S_2$ | $1 + S_3$ | MAX ETAM |
|---|---|---|---|---|---|---|---|---|
| 0 | 0 | 0 | 0 | 1 | 1 | 1 | 1 | 4 |
| 0 | 0 | 0 | 1 | 2 | 2 | 2 | 4 | 10 |
| 0 | 0 | 1 | 0 | 2 | 2 | 4 | 2 | 10 |
| 0 | 0 | 1 | 1 | 3 | 3 | 3 | 3 | 12 |
| 0 | 1 | 0 | 0 | 2 | 4 | 2 | 2 | 10 |
| 0 | 1 | 0 | 1 | 3 | 3 | 3 | 3 | 12 |
| 0 | 1 | 1 | 0 | 3 | 3 | 3 | 3 | 12 |
| 0 | 1 | 1 | 1 | 4 | 2 | 2 | 2 | 10 |
| 1 | 0 | 0 | 0 | 4 | 2 | 2 | 2 | 10 |
| 1 | 0 | 0 | 1 | 3 | 3 | 3 | 3 | 12 |
| 1 | 0 | 1 | 0 | 3 | 3 | 3 | 3 | 12 |
| 1 | 0 | 1 | 1 | 2 | 4 | 2 | 2 | 10 |
| 1 | 1 | 0 | 0 | 3 | 3 | 3 | 3 | 12 |
| 1 | 1 | 0 | 1 | 2 | 2 | 4 | 2 | 10 |
| 1 | 1 | 1 | 0 | 2 | 2 | 2 | 4 | 10 |
| 1 | 1 | 1 | 1 | 1 | 1 | 1 | 1 | 4 |

To illustrate the capability of the present invention, an ETAM calculator circuit with windows of four signal lines will be used. Each ETAM calculator circuit should output a "1" in case ETAM≧6. Referring to TABLE II, Lines 1 ("0000") and 16 ("1111") will give a maximum ETAM value of 4 and thus will never produce a "1" regardless of the values of $B_i^{-1}$. All the other cases are potential candidates for applying inversion depending on the values of the $r_i = B_i^{-1} \oplus B_i$. There are two cases: one where $1+S_i=3$ for all signal lines (i.e., lines 4, 6, 7, 10, 11 and 13 in TABLE II), and one that has three times a "2" and one time a "4" (i.e., lines 2, 3, 5, 8, 9, 12, 14 and 15 in TABLE II). In the first case, there should be at least three $r_i$ equal to one to generate an ETAM value greater than 6. In other words, at least three of the $r_i = B_i^{-1} \oplus B_i$ should be equal to "1". Therefore, to simplify the design, the encoded signals are complemented only when the following condition is satisfied:

$$r_0 + r_1 + r_2 + r_3 \geq 3 \quad \text{Equation (13)}$$

Thus, Equation 13 does not cover the case of two $r_i$ being equal to one that results in ETAM=6. In the second case, observe that ETAM=6 can be reached in two different ways: (a) one time a "4" and one time a "2" and (b) three times a "2". Equation 13 will cover case (b) but not case (a). Covering case (a) adds substantial complexity to the circuit, and is therefore ignored since it will result in an ETAM value of 6 which will not have to be inverted as mentioned before. Therefore, the value of ETAM=6 will be considered a high ETAM value according to the following rules:

(a) three or more "2"s will produce a "1";
(b) a "4" and one "2" will not produce a "1"; and
(c) two "3"s will not produce a "1".

Figure 13:
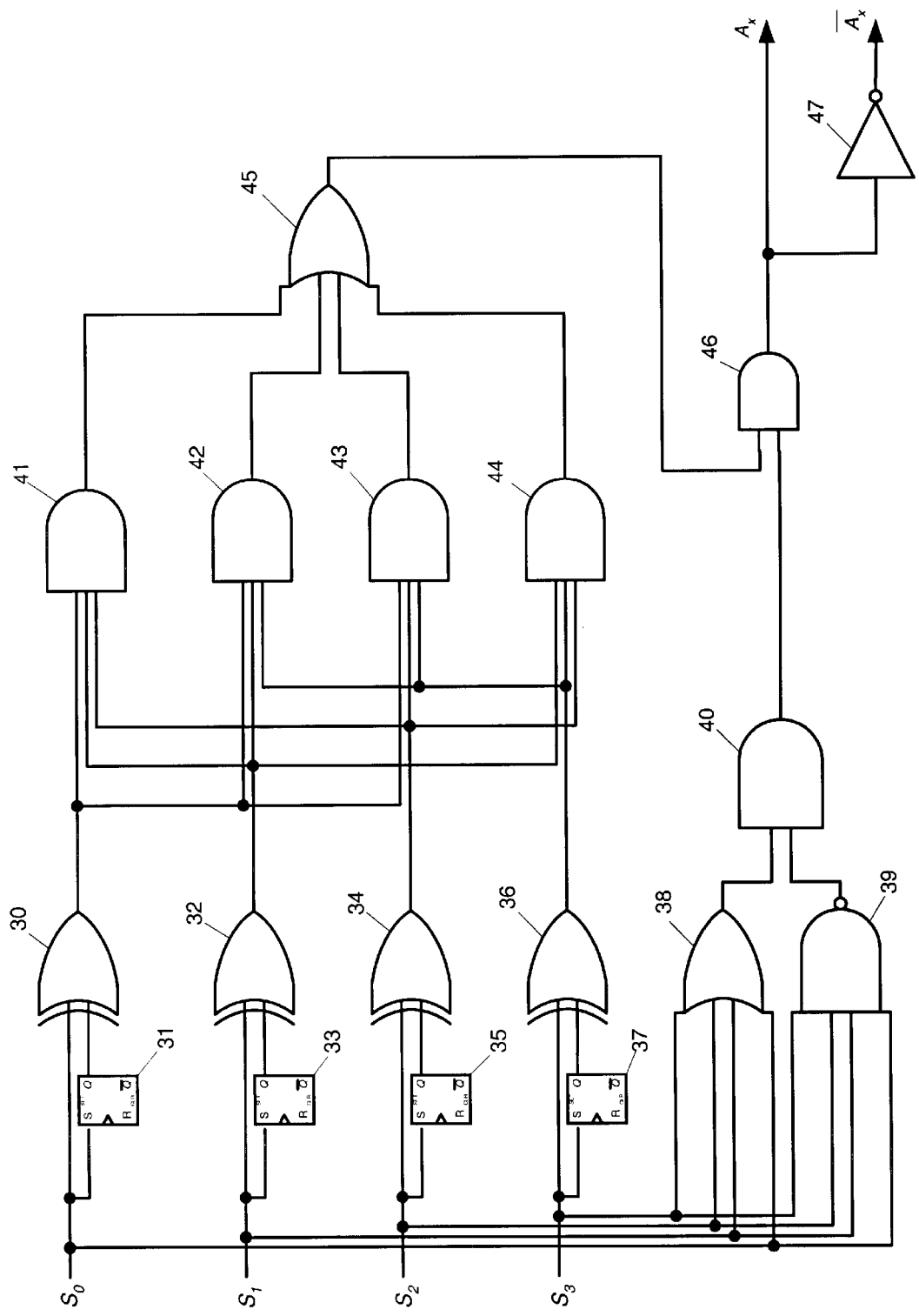
FIG. 13 illustrates an embodiment of an extended transition activity measurement calculator for a 4-bit window.

Following these rules, the ETAM calculator circuit shown in FIG. 13 only has to ensure that Equation 13 is satisified. For a 4-bit window, each input ($S_x$–$S_{x+1}$) is connected to a delay gate (31, 33, 35, 37) and an exclusive-OR gate (30, 32, 34, 36). For each signal line $S_x$–$S_{x+1}$ that is in the 4-bit window, the delay gate holds the previous data bit for that signal line, and that previous data bit is compared against the current data bit by the exclusive-OR gate. Of course, the delay gate also stores the current data bit for use with the following data set.

In order to satisfy Equation 13, at least three of the exclusive-OR gates need to be set to one. To satisfy Equation 13, the ETAM calculator circuit must produce "1" to cover lines 2–15 of TABLE II. The outputs of the exclusive-OR gates are input to the AND gates 41–44. The AND gates 41–44 are connected to the exclusive-OR gates such that at least one of the AND gates 41–44 if at least three of the exclusive-OR gates outputs a "1". The outputs of the AND gates 41–44 are connected to OR gate 45, which outputs a "1" if any of the AND gates outputs a "1".

The ETAM calculator circuit must also exclude lines 1 and 16 of TABLE II which may also produce a "1" through Equation 13. To exclude lines 1 and 16 to TABLE II, the ETAM calculator circuit adds an NAND gate 39 that tests for all signals $B_i$ being "1" and an OR gate 38 that tests for all signals $B_i$ being "0". The results are input to AND gate 40, which outputs a signal to AND gate 46 that acts as an enable signal for the results of Equation 13. If all signals $B_i$ are "1" or "0", the AND gate 46 outputs a "0" and the inverter 47 outputs a "1". Otherwise, if all signals $B_i$ are not "1" or "0", the AND gate 46 outputs the results ($A_x$) of Equation 13 and the inverter 47 outputs the complement of the result.

Referring to FIG. 12, as noted for the exemplary 32-bit signal group, eight ETAM calculator circuits 20–27 are needed, one for each 4-bit window. Each ETAM calculator circuit 20–27 outputs a signal $A_x$ and its complement to indicate if the 4-bit window has a high ETAM value. The eight ETAM calculator circuit outputs (and their complements) are connected to the majority ETAM circuit 28, which outputs an inversion signal.

Figure 14:
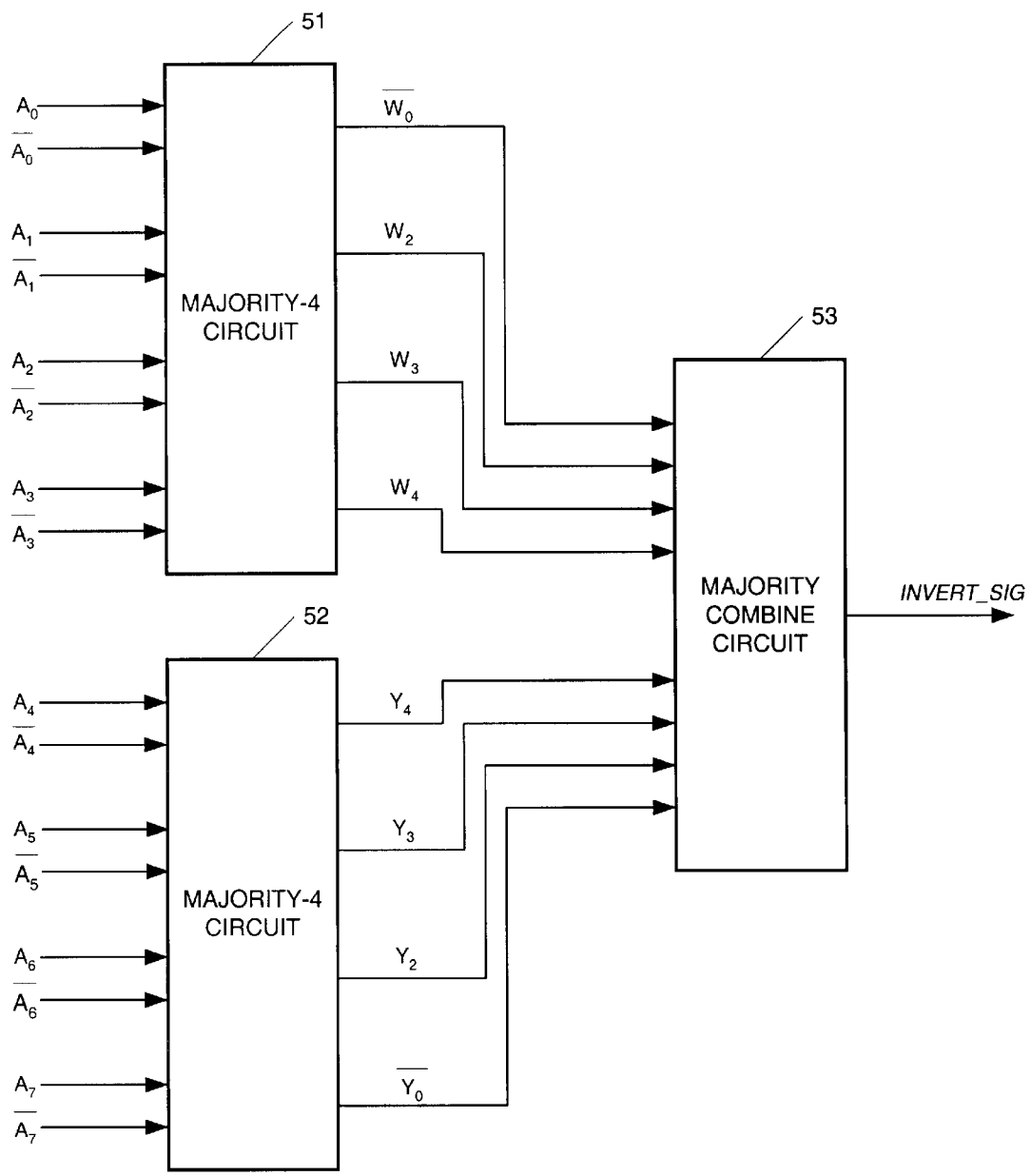
FIG. 14 illustrates the connection between the majority-4 determination circuits and a majority combination circuit for an exemplary 32-bit signal group.

Referring to FIG. 14, the majority ETAM circuit is shown in greater detail. The eight outputs $A_0$–$A_7$ and complements are connected to two majority-4 circuits 50–51 with each majority-4 circuit receiving the output from four ETAM calculator circuits. The outputs from one majority-4 circuit 50 are referenced as $\overline{W}_0, W_2, W_3, W_4$ and the outputs from the other majority-4 circuit 51 are referenced as $\overline{Y}_0, Y_2, Y_3, Y_4$. The outputs from the majority-4 circuits are connected to a majority combine circuit 52, which outputs the inversion signal INVERT_SIG.

Figure 15:
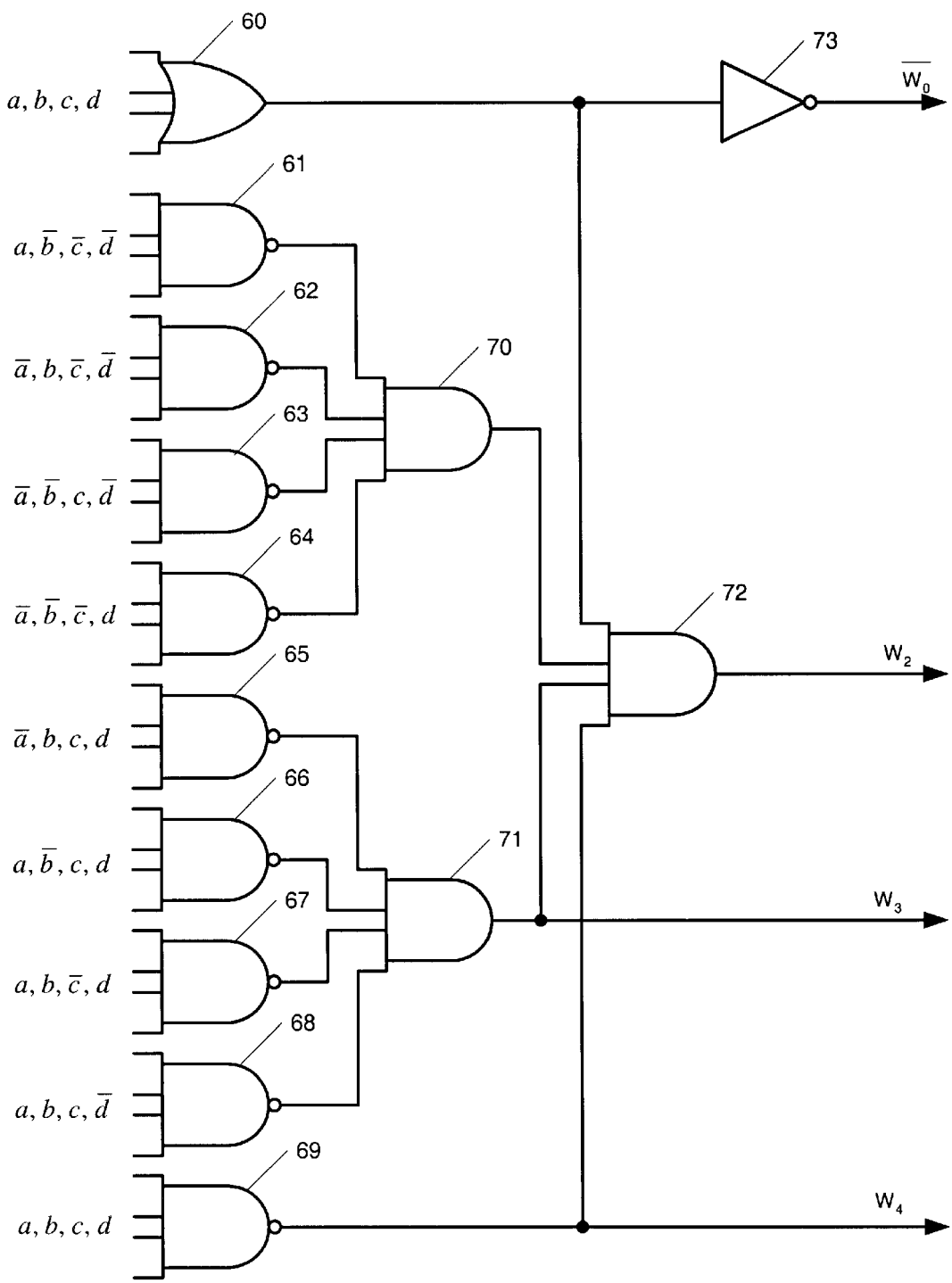
FIG. 15 illustrates an embodiment of the majority-4 determination circuit for an exemplary 32-bit signal group.

Referring to FIG. 15, a majority-4 circuit is shown in greater detail. The majority-4 circuit has eight inputs (i.e., the outputs of four ETAM calculator circuits and their complements) and outputs the values Wj (or their complements) which satisfy the following property: Wj=1, if and only if there are j ones among the eight inputs to the majority-4 circuit.

If the four inputs to the majority-4 circuit are denoted as a, b, c and d (along with their complements), then these inputs are distributed among the OR gate 60 and the NAND gates 61–69 as follows:

1. The OR gate 60 is connected to the following inputs: a, b, c, d.
2. The NAND gate 61 is connected to the following inputs: a, $\overline{b}$, $\overline{c}$, $\overline{d}$.
3. The NAND gate 62 is connected to the following inputs: $\overline{a}$, b, $\overline{c}$, $\overline{d}$.
4. The NAND gate 63 is connected to the following inputs: $\overline{a}$, $\overline{b}$, c, $\overline{d}$.
5. The NAND gate 64 is connected to the following inputs: $\overline{a}$, $\overline{b}$, $\overline{c}$, d.
6. The NAND gate 65 is connected to the following inputs: $\overline{a}$, b, c, d.
7. The NAND gate 66 is connected to the following inputs: a, $\overline{b}$, c, d.
8. The NAND gate 67 is connected to the following inputs: a, b, $\overline{c}$, d.
9. The NAND gate 68 is connected to the following inputs: a, b, c, $\overline{d}$.
10. The NAND gate 69 is connected to the following inputs: a, b, c, d.

The outputs of OR gate 60 is input to an inverter 75. When all the inputs to the OR gate 60 are "0" the output signal at $\bar{W}_0$ will be a "1". Likewise, the output of NAND gate 69 is $W_4$, which will be a "0" if all the inputs to the NAND gate 69 are "1". The AND gate 70 receives the outputs from NAND gates 61–64 and the AND gate 71 receives the outputs from the NAND gates 65–68. The output of the AND gate 71 is output as $W_3$. The output of the AND gates 70, 71, the OR gate 60 and the NAND gate 69 are received by the AND gate 72 and output as $W_2$.

Figure 16:
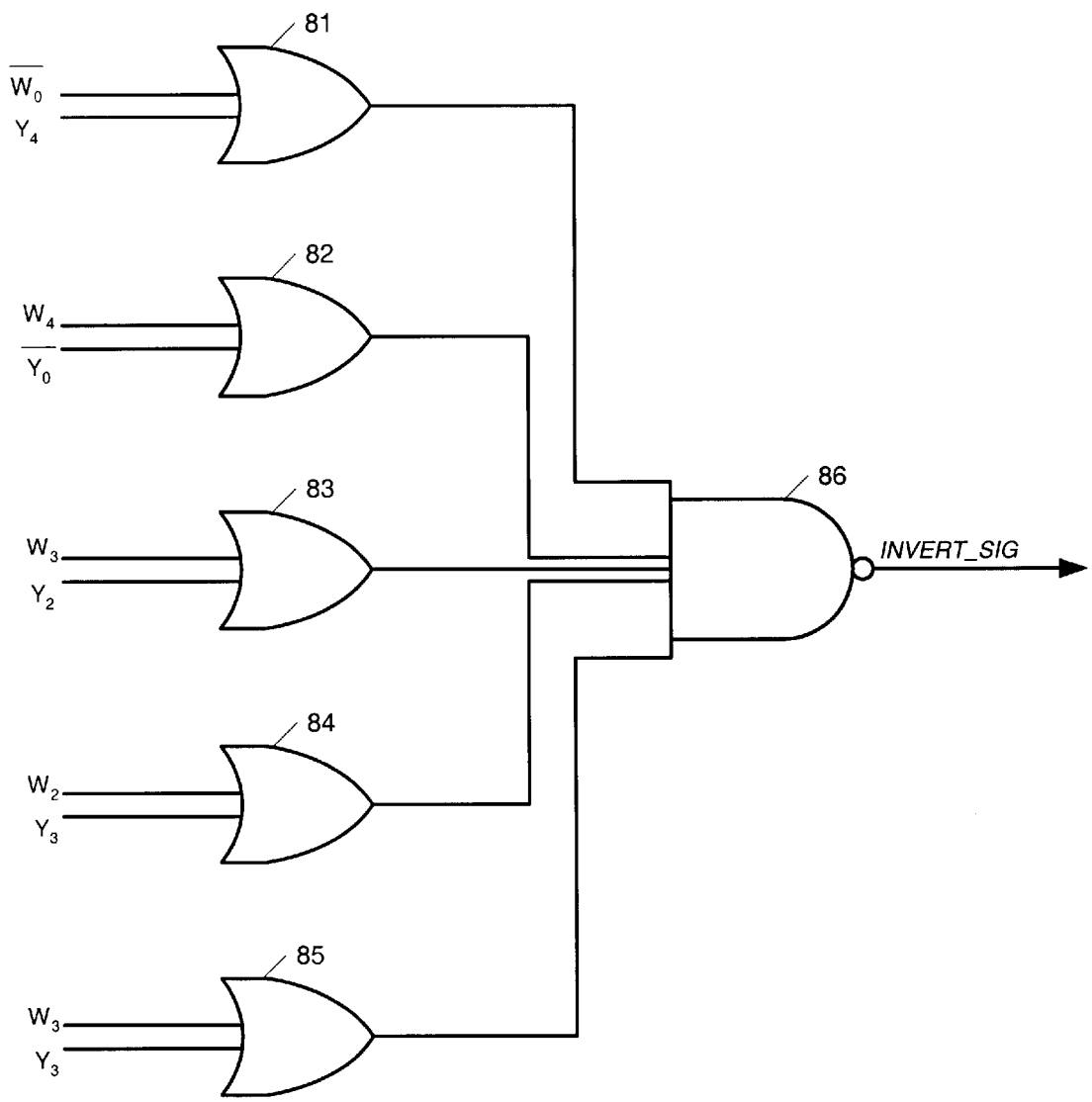
FIG. 16 illustrates an embodiment of the majority combination circuit for an exemplary 32-bit signal group.

Referring to FIG. 16, the majority combine circuit 52 is described in greater detail. To implement the majority combine circuit 52 with eight inputs, it should output a one whenever the total number of ones among the eight inputs is greater or equal than five. In other words, the two circuits producing outputs $W_j$ and $Y_j$ should have an output that satisfies:

$$M = W_4 \cdot \bar{Y}_0 + \bar{W}_0 \cdot Y_4 + W_3 \cdot Y_2 + W_2 \cdot Y_3 + W_3 \cdot Y_3 \qquad \text{Equation (14)}$$

OR gates 81–85 receive the inputs from the majority-4 circuits 50, 51 and the outputs of the OR gates 81–85 are combined by the NAND gate 86. If the all the inputs to the NAND gate 86 are "1" the NAND gate 86 outputs a signal indicating that the ETAM calculations indicate that the encoded data set should be inverted.

Referring to FIG. 17, the signal-decoding interface will be described in greater detail. The signal inverter 90 receives the encoded data signals and the inversion signal INVERT_SIG. If the inversion signal INVERT_SIG is "1" then the encoded data signals will be complemented again to return them to their original state. Otherwise, the encoded data signals pass through the signal inverter 90 without change. The signal inverter 90 outputs the encoded data signals to the multiplexer 91. The multiplexer 91 selects one of the decoders 92–93 that reverses the cross-connections in the encoders 10–11. The multiplexer 91 receives the encoding signal from the comparator 93 that selects the encoding scheme. The comparator 93 operates in the same manner as the comparator shown in FIG. 11 in that it selects which decoder to use based on the SIZE and $2^{N/2}$ inputs (i.e., the same inputs that are used by the comparator 12 in FIG. 11).

Referring to FIG. 18, a second embodiment of the signal-decoding interface is shown. The signal-decoding interface is identical to the signal-decoding interface illustrated in FIG. 17, with the exception that this signal-decoder does not have the comparator 93 to select the multiplexer 91. The select signal ENCODE is received from the signal-encoding interface shown in FIG. 11.

The foregoing description of the aspects of the invention has been presented for purposes of illustration and description. It is not intended to be exhaustive or to limit the invention to the precise form disclosed, and modifications and variations are possible in light of the above teachings or may be acquired from practice of the invention. The principles of the invention and its practical application were described in order to explain the present invention to enable one skilled in the art to utilize the invention in various embodiments and with various modifications as are suited to the particular use contemplated.

Thus, while only certain aspects of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

What is claimed is:

1. An encoding method for a plurality of closely spaced electrical signal paths, the encoding method comprising:
    determining signal transition activity for each electrical signal path for a predetermined set of electrical impulses;
    grouping the electrical signal paths into a plurality of source windows, each source window comprising a portion of the electrical signal paths and each portion comprising adjacent electrical signal paths; and
    cross-connecting the source windows to a plurality of target windows based upon a base capacitance between each of the electrical signal paths and a ground plane layer, a coupling capacitance between each of the electrical signal paths and the signal transition activity.

2. The encoding method as claimed in claim 1, the cross-connecting of source windows to target windows further comprises arranging the connections between the plurality of source windows and the plurality of target windows such that target windows having electrical signal paths with low signal transition activity are interposed between target windows having high signal transition activity.

3. The encoding method as claimed in claim 1, the cross-connection of source windows to target windows further comprises arranging the connections between the plurality of source windows and the plurality of target windows such that the two target windows having electrical signal paths with highest signal transition activity are separated by the remaining target windows.

4. An encoding method for a plurality of closely spaced electrical signal paths, the encoding method comprising:
    determining signal transition activity for each electrical signal path for a given set of electrical impulses;
    dividing the electrical signal paths into a number of windows such that $W = P/W_s$, wherein each window comprises a number of adjacent electrical signal paths, and W represents the number of window, P represents the number of electrical signal paths, and $W_s$ represents the number of electrical signal paths in a window;
    arranging the windows such that windows having electrical signal paths with a large amount of signal transition history are separated by windows having electrical signal paths with a low amount of signal transition history.

5. An encoding method for a plurality of closely spaced electrical signal paths on a substrate, the encoding method comprising:
    determining a signal transition history for each electrical signal path for a given set of electrical impulses;
    dividing the electrical signal paths into a number of windows such that $W = P/W_s$, wherein each window comprises a number of adjacent electrical signal paths, and W represents the number of window, P represents the number of electrical signal paths, and $W_s$ represents the number of electrical signal paths in a window;
    arranging the windows such that the two windows having electrical signal paths with the largest amount of signal transition history are separated by the remaining windows.

6. An encoding method for a plurality of closely spaced electrical signal paths on a substrate, wherein a predetermined set of synchronous electrical impulses traverse the electrical signal paths, the encoding method comprising:
    determining a signal transition history for each electrical signal path for the predetermined set of synchronous electrical impulses;

dividing the electrical signal paths into a number of windows such that $W=P/W_s$, wherein each window comprises a number of adjacent electrical signal paths, and W represents the number of window, P represents the number of electrical signal paths, and $W_s$ represents the number of electrical signal paths in a window;

arranging the windows such that the two windows having electrical signal paths with the largest amount of signal transition history are separated by the remaining windows; and analyzing the signal transitions within each window, and if a majority of the windows contain a large amount of transition activity, inverting the synchronous electrical impulses.

7. An encoding method for an address bus on a substrate, wherein a given set of synchronous address bit signals traverse the address bus, the encoding method comprising:

determining a signal transition history for each address bit on the address bus;

dividing the address bus into a number of windows such that $W=P/W_s$, wherein W represents the number of windows, P represents the number of bits in the address bus, and $W_s$ represents the number of address bus bits in a window;

arranging the windows such that the two windows having address bus bits with the largest amount of signal transition history are separated by the remaining windows; and analyzing the address bus signal transitions within each window, and if a majority of the windows contain a large amount of transition activity, inverting the address bit signals traversing the address bus.

8. An encoding method for an address bus on a substrate, wherein a given set of synchronous address bit signals traverse the address bus, the encoding method comprising:

determining a signal transition history for each address bit on the address bus;

dividing the address bus into a number of windows such that $W=P/W_s$, wherein W represents the number of windows, P represents the number of bits in the address bus, and $W_s$ represents the number of address bus bits in a window;

arranging the windows such that windows having address bits with a large amount of signal transition history are separated by windows having address bits with a low amount of signal transition history.

analyzing the address bus signal transitions within each window, and if a majority of the windows contain a large amount of transition activity, inverting the address bit signals traversing the address bus.

* * * * *